United States Patent
Goosey, Jr. et al.

(10) Patent No.: US 7,265,911 B2
(45) Date of Patent: Sep. 4, 2007

(54) ZOOM LENS SYSTEM HAVING VARIABLE POWER ELEMENT

(75) Inventors: William T. Goosey, Jr., Fairport, NY (US); John N. Border, Walworth, NY (US); David W. Sandford, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/208,577

(22) Filed: Aug. 22, 2005

(65) Prior Publication Data

US 2007/0041101 A1  Feb. 22, 2007

(51) Int. Cl.
G02B 15/14 (2006.01)
G02B 3/12 (2006.01)

(52) U.S. Cl. ...................... 359/676; 359/666
(58) Field of Classification Search ........ 359/676–692, 359/665, 666, 846
See application file for complete search history.

(56) References Cited

U.S. PATENT DOCUMENTS

| | | | | |
|---|---|---|---|---|
| 4,784,479 A | * | 11/1988 | Ikemori | 359/666 |
| 4,859,041 A | * | 8/1989 | Suda | 359/676 |
| 5,443,506 A | * | 8/1995 | Garabet | 623/6.13 |
| 5,574,598 A | | 11/1996 | Koumura et al. | 359/666 |
| 6,033,070 A | | 3/2000 | Kearns | 351/168 |
| 6,369,954 B1 | | 4/2002 | Berge et al. | 359/666 |
| 6,437,925 B1 | * | 8/2002 | Nishioka | 359/726 |
| 6,934,090 B2 | * | 8/2005 | Nagaoka et al. | 359/665 |
| 6,934,095 B2 | * | 8/2005 | Mihara | 359/726 |
| 6,950,245 B2 | * | 9/2005 | Nishioka et al. | 359/721 |
| 2001/0017985 A1 | | 8/2001 | Tsuboi et al. | 396/506 |
| 2002/0118464 A1 | | 8/2002 | Nishioka et al. | 359/642 |
| 2004/0179280 A1 | | 9/2004 | Nishioka | 359/846 |
| 2005/0018127 A1 | | 1/2005 | Galstian et al. | 349/200 |

FOREIGN PATENT DOCUMENTS

| | | |
|---|---|---|
| EP | 0911360 | 4/1999 |
| WO | WO97/10527 | 3/1997 |
| WO | WO 03/069380 | 8/2003 |
| WO | WO 2004/038480 | 5/2004 |
| WO | WO 2004/083899 | 9/2004 |
| WO | WO 2005/073762 | 8/2005 |

OTHER PUBLICATIONS

Varable-focus lens wit 1-kHz bandwidth, May 17, 2004/vol. 12, No. 10 / Optics Express, pp. 2138-2149.
B. Berge and J. Peseux, "Variable Focal Lens Controlled by an External Voltage: An Application of Electrowetting", Eur. Phys. J. E. 3, 2000, pp. 159-163.

* cited by examiner

Primary Examiner—Timothy Thompson
Assistant Examiner—M. Hasan
(74) Attorney, Agent, or Firm—William R. Zimmerli

(57) ABSTRACT

A multiple group variable focal length lens is provided. The lens has a first lens group including a variable power lens element and is positioned in a stationary manner along an optical axis. The lens also has a second lens group moveably positioned along the optical axis. The variable power lens element can be an electrically controllable liquid lens having a surface with a variable radius of curvature created by two liquids having distinct indices of refraction with one of the liquids having an index of refraction greater than 1.60. Alternatively or additionally, at least one of the liquids used in the liquid lens can include nanoscale particles.

30 Claims, 20 Drawing Sheets

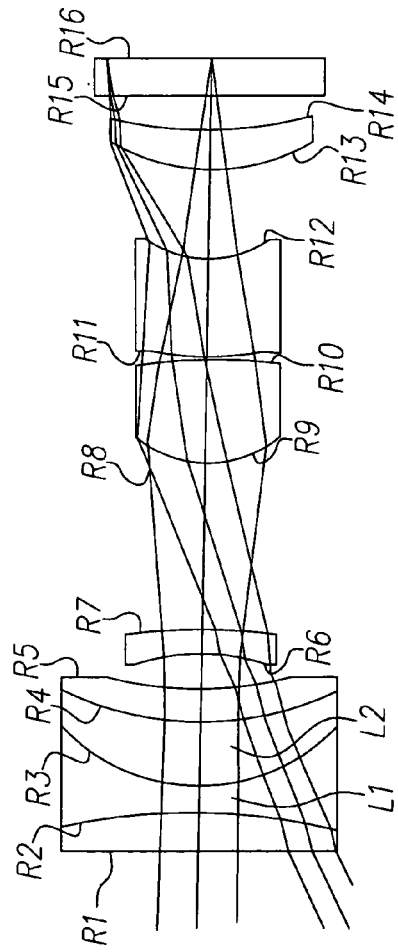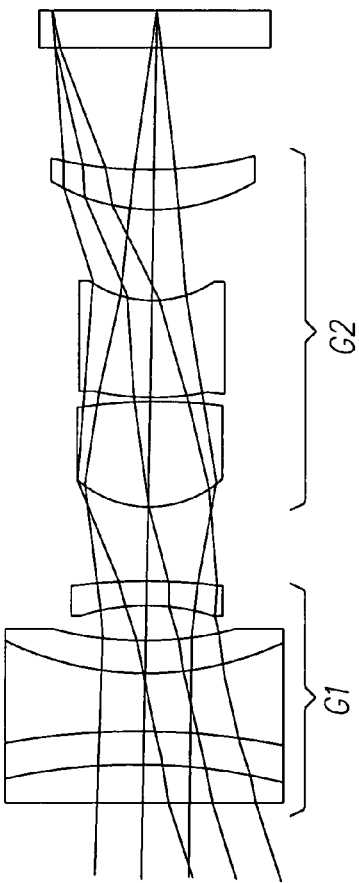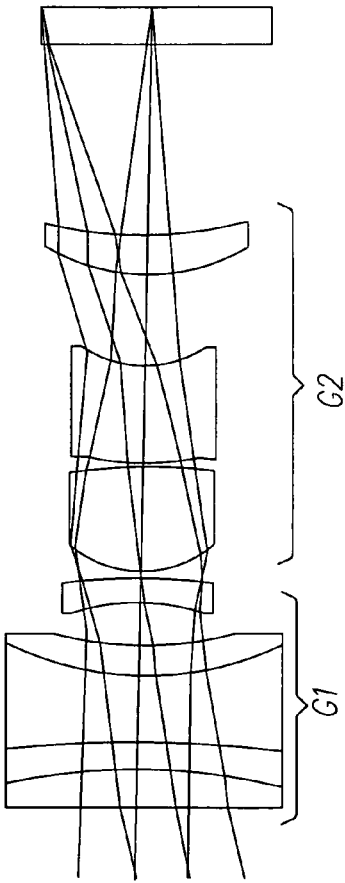

ZOOM LENS SYSTEM HAVING VARIABLE POWER ELEMENT

FIELD OF THE INVENTION

This invention relates generally to lens design, and in particular to variable focal length lens systems having at least one variable power element.

BACKGROUND OF THE INVENTION

Conventional variable focal length lens systems, for example, zoom lens systems, typically include at least one group of lenses that is moved along an optical axis in order to change the focal length of the system resulting in variable magnification of an object at an image plane of the system. Zoom lens systems can include multiple moving groups or a combination of fixed lens groups and moving lens groups. These types of lens systems have various design forms with each design form having its own set of strengths in terms of size, performance, cost, mechanical complexity, etc. Conventional variable focal length lens systems mechanically move lens groups to achieve variable focal length. This movement adds cost, complexity, and size to the lens system. In consumer camera applications, for example, it is desirable to have a compact and inexpensive zoom lens system.

Variable power lens elements are known. For example, U.S. Pat. No. 6,369,954 B1 and PCT Application Publication No. WO 2003/069380 disclose electrically controllable liquid lenses. Each of these lenses is composed of two immiscible liquids having different refractive indices contained in a cavity having transparent outer surfaces. Electrodes are located on inner sides of the cavity. When a voltage is applied to the electrodes, the curvature of the interface between the two liquids changes in response to an electric field that is established between the electrodes thereby causing a change in the optical power of the liquid lens. The response time of the electrically controllable liquid lenses is approximately 0.02 to 0.1 seconds and the size is typically 2 to 10 mm. The shape of the optical surface of these liquid lenses is minimally adjustable through modification of the electrodes allowing astigmatism to be present in the optical system.

U.S. Pat. No. 6,369,954 B1 discloses the use of concave or convex cavity surfaces to obtain a particular diopter value of the device at rest and first and second liquids being non-miscible, of different optical indexes, and of substantially same density with the first liquid being conductive and the second liquid being insulating. Additionally, the conductive liquid may be made conductive by the addition of ionic components. PCT Application Publication No. WO 2003/069380 discloses the use of liquids having a refractive index between 1.25 and 1.60 with added molecular constituents to increase the density of one of the liquids to enable the densities of the two liquids to be matched thereby avoiding gravitational effects. Additionally, the transparent outer surfaces have aspheric shapes to provide desired initial focusing characteristics and to act as a field flattener.

US Patent Application Publication Nos. US 2004/0179280 and US 2005/0018127 disclose liquid crystal lenses. In this type of lens, a liquid crystal material is held between a series of electrodes. Applying a voltage to the electrodes causes the liquid crystals to align with the electric field such that the optical power of the liquid crystal lens changes. Liquid crystals lenses response time can be as little as 0.003 seconds with a size range similar to electrically controllable liquid lenses. As with the liquid lenses, the electric field determines the overall optical quality of the liquid crystal lens. As such, liquid crystal lenses have minimal adjustability through electrode modification and astigmatism is present in the lens system.

U.S. Pat. No. 5,574,598 discloses pressure controllable liquid lenses. This lens includes a liquid filled cavity having transparent surfaces made of an elastomeric material. When pressure is applied to an adjacent cavity, the elastomeric material surfaces of the liquid filled cavity can be stretched into a curved shape. When this happens, the liquid lens has optical power. The optical power of the lens can be controlled within the elastic limits of the transparent elastomeric material by varying the pressure applied to the adjacent cavity. In pressure controllable liquid lenses, the optical surface tends to be spherical in shape since the surface is determined by surface tension. Consequently, astigmatism is also present in this lens assembly.

In the article "Variable-focus lens with 1-kHz bandwidth", by H. Oku, K. Hashimoto, M. Ishikawa, Optics Express, Vol. 12, No. 10, May, 2004, pages 2138-2149, a pressure controllable liquid lens is described. This lens also includes a liquid filled cavity having transparent surfaces made of an elastomeric material. A piezoelectric actuator is used to apply a pressure to the transparent surfaces in order to change the shape of these surfaces. Varying the voltage applied to the piezoelectric actuator varies the amount of pressure applied to the lens. This varies the optical power of the lens. The speed of response of this lens system is approximately 0.001 seconds. Astigmatism is also present in this pressure controllable liquid lens.

While any of the lenses described above can be used in variable focal length lens systems, the response time (under 0.1 seconds) and size (typically 2 to 10 mm) characteristics of electrically controllable liquid lenses and liquid crystal lenses make these lenses particularly suitable for use in zoom lenses for consumer cameras. Pressure controllable lenses can also be used provided the size of the lens is compatible to the application contemplated.

Zoom lenses including an electrically controllable variable power lens are known. For example, PCT Application Publication No. WO 2004/038480 discloses a zoom lens comprising, from the object side to the image side, a front fixed lens group, a controllable lens group, and a rear fixed lens group. The controllable lens group comprises a voltage-controlled electrowetting device which contains a first fluid and a second fluid having different refractive indices in the range 1.25 to 1.60 with at least two first fluid-second fluid interfaces. The curvatures, and therefore the lens power, of these interfaces can be changed independently by supplying a voltage to electrodes of the device, so that no mechanical movement of lens elements is needed.

PCT Application Publication No. WO 2004/083899 discloses an optical component for changing angular magnification of an imaging device. The optical component comprises a chamber having a first substrate on one side and a second substrate on the opposite side for separately disposing a first liquid drop and a second liquid drop along an optical axis. The chamber is also filled with a liquid which is different from the first and second liquid drops. The optical component also has a first electrode adjacent to the first side, a second electrode adjacent to the second side, and a third electrode layer between the first and second electrode layers for applying different electric fields on the first and second liquid drops to change the focal lengths of the first and second liquid drops, without changing the sum of the focal lengths.

The zoom lenses described above have limitations. Each of the variable power lenses described in these lens systems provides multiple variable optical surfaces that tend to induce an astigmatism component into each lens system when voltage is applied to the variable power lens. The astigmatism produced by the use of variable power lenses should be corrected or at least reduced in order to improve the image quality of these zoom lenses. While there is also a desired to reduce the number of moving groups in zoom lenses in order to reduce the overall size and complexity of the lenses, eliminating all the moving groups increases astigmatism in the lens system and sacrifices imaging quality. Additionally, and at least in the case of the liquid lens systems described above, the various competing requirements for the liquids, for example, density, refractive index, freezing point, boiling point, conductivity, etc., make selection of the appropriate liquid very difficult to optimize.

As such, there is a need for variable focal length lens systems having a reduced number of moving lens groups, and less adverse effects caused by aberrations, such as astigmatism, lateral color, etc. There is also a need for independent adjustment of at least one of the characteristics of the liquids used in liquid lenses. These characteristics include, for example, density, refractive index, freezing point, boiling point, conductivity, etc.

SUMMARY OF THE INVENTION

According to one aspect of the invention, a multiple group variable focal length lens is provided. The lens has a first lens group including a variable power lens element and is positioned in a stationary manner along an optical axis. The lens also has a second lens group moveably positioned along the optical axis.

According to another aspect of the invention, a multiple group variable focal length lens is provided. The lens has a lens group located in a fixed position along an optical axis. The lens group includes an electrically controllable liquid lens having a variable power lens element. The variable power lens element includes a surface having a variable radius of curvature created by two liquids having distinct indices of refraction with one of the liquids having an index of refraction greater than 1.60.

According to another aspect of the invention, a liquid lens is provided. The liquid lens includes a first surface and second surface. A first liquid and a second liquid are located between the first surface and the second surface such that an interface between the first liquid and the second liquid forms a surface having a variable radius of curvature. At least one of the first liquid and the second liquid includes nanoscale particles. Salts and/or miscible liquids and/or nanoparticles can be added to one or more of the liquids of the liquid lens to adjust the density and/or refractive index of the liquid(s) and/or the freezing point of the liquid(s) and/or boiling point of the liquid(s).

BRIEF DESCRIPTION OF THE DRAWINGS

In the detailed description of the preferred embodiments of the invention presented below, reference is made to the accompanying drawings, in which:

FIGS. 5A, 5B, and 5C are cross sectional views of a first example embodiment made in accordance with the invention in wide angle, mid-range, and telephoto zoom positions, respectively;

DETAILED DESCRIPTION OF THE INVENTION

Figure 1A:
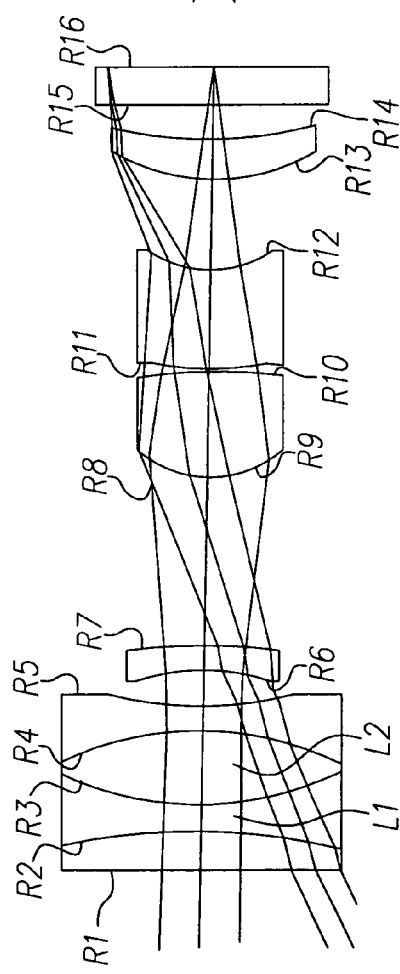
FIGS. 1A, 1B, and 1C are cross sectional views of a first example embodiment made in accordance with the invention in wide angle, mid-range, and telephoto zoom positions, respectively.

The present description will be directed in particular to elements forming part of, or cooperating more directly with, apparatus in accordance with the present invention. It is to be understood that elements not specifically shown or described may take various forms well known to those skilled in the art.

Referring generally to FIGS. 1A-8C, the present invention incorporates at least one variable optical power lens element in a variable focal length lens system 10, 20. When compared to lens systems that do not incorporate at least one variable optical power lens element, this results in the reduction of at least one moving group of the variable focal length lens system and reduces the overall length of the variable focal length lens system 10, 20. Also, the diameter of the most object side lens element of the system can be reduced depending on the specific application contemplated.

When a beam of light is obliquely incident on a refracting surface, astigmatism is evident and varies with the curvature of the surface. While this is correctable by "bending" the non-variable surfaces in the variable power lens element, this correction is ideal only for one curvature of the variable surface. As the variable curvature is adjusted to allow zooming, a compensating motion or curvature change is required elsewhere in the zoom lens to negate the changing astigmatism and restore the image quality at the new zoom position.

A multiple group variable focal length lens made in accordance with the present invention comprises a first lens group and a second lens group. The first lens group includes a variable power lens element and is positioned in a stationary manner along an optical axis. The second lens group is moveably positioned along the optical axis. The variable power lens element can be of any suitable type, for example, any of the following types which have been described in more detail above—electrically controllable liquid lenses, liquid crystal lenses, or pressure controllable liquid lenses.

The first lens group can be located on an object side of the optical axis with the second lens group located on an image side of the optical axis depending on the application of the multiple group variable focal length lens. The absolute value of the optical power of the first lens group can be less than the absolute value of the optical power of the second lens group. This is also application dependent.

At least one additional lens group can be included in other embodiments of the invention depending on the application of the multiple group variable focal length lens. The additional lens group(s) can be stationary, moving, or a combination of both.

While the present invention finds application in zoom lens systems where a reduction in the number of moving lens groups and/or better aberration control is desired, the invention will be described herein with reference to a (−+) reverse telephoto zoom lens system. This zoom lens design form is popular because it has a relatively straightforward design concept, has a long back focus, which is helpful when including auxiliary filters, cover plates, etc., and is often close enough to telecentric to be useful in digital imaging systems. In this design, two moving lens groups move simultaneously to accomplish the zoom action. The overall length of the zoom lens assembly is established by the distance the moving lens groups travel during the zoom action. Reducing the traveling distance of the moving lens groups during the zoom action reduces the overall length of the zoom lens system. Doing this can also lead to a reduction in the lens diameters of one or more lens groups as well.

Referring to FIGS. 1A-1C and 5A-5C, first and second example embodiments of the invention are shown. In the first example embodiment, a compact zoom lens design of the (−+) type is shown. The negative powered first lens group is a stationary lens group comprising at least one variable power element. Other lens elements can be included to provide additional aberration correction in the first lens group.

The second embodiment of the invention demonstrates the effects of refractive index and dispersion changes in the media surrounding the variable power surface. When tailored to suit the needs of a particular application, the appropriate selection of media with respect to, for example, refractive indices and/or dispersion characteristics, produces a lens system having improved performance and/or lateral color properties.

In both example embodiments, the surfaces or faceplates that surround the variable power surface of the first lens group can have optical power in order to balance the astigmatism and other field aberrations that occur as the variable power surface changes during zooming. The optically powered surrounding surfaces and the moving positive powered second lens group compensates for the astigmatism generated by the variable power lens over the entire zoom range. Additionally, spherical surfaces are used for the faceplates because improved aberration correction and control was achieved. However, using an aspheric surface on one or more of the faceplates helps to achieve larger zoom ranges, larger field of view, or faster F/# systems.

The overall length of the zoom lens systems 10, 20 described in the first and second example embodiments is reduced when compared to comparable traditional (−+) two moving group zoom lens systems, for example, lens systems having similar first order optical properties and comparable optical performance. A typical (−+) two moving group zoom lens with the first order optical properties used in either the first or second example embodiments and having equivalent performance is approximately 20-25% longer in length in its longest position. Also, depending on the particular application contemplated, the reduced front vertex to image plane length of the lens system of the invention can help to reduce the diameter of the one or more lenses in the first lens group.

Again referring to FIGS. 1A-1C and 5A-5C, first and second example embodiments of the invention are shown, respectively, at wide angle, intermediate or mid-range, and telephoto zoom positions when focused at infinity. In both example embodiments, the lens system 10, 20 includes from an object side a stationary (relative to an image plane) negative powered lens group G1 positioned along an optical axis. Lens group G1 includes at least one variable power surface R3. An aperture stop R8 which is part of a mechanically moving positive powered lens group G2 follows. Lens group G2 moves along the optical axis contributes to the focal length change of the lens system 10, 20 and maintains the focus of the lens system at a fixed image plane during zooming. An optional plano-plano plate defined by surfaces R15 and R16 indicates that an element having no optical power, for example, a filter of any type (e.g. low pass), an image sensor (e.g. ccd) cover plate, etc., can be included in the lens system 10, 20.

In each example embodiment, the variable power element is an electrically controllable liquid lens like those described above. However, the lens system 10, 20 can include a pressure controllable liquid lens or liquid crystal lens like those described above. In the first and second example embodiments, faceplates or surfaces R1, R2 and R4, R5 contain liquids L1, L2 having different characteristics, for example, refractive index, Abbe-number (v), etc, that create a variable boundary between each other, surface R3.

When the radius of curvature of surface R3 is changed during zooming the aberrations created by surface R3 vary with its curvature. For example, astigmatism and/or field curvature can be present. Providing surfaces R1, R2, and R4, R5 with optical power by providing one or more of these surfaces with a radius of curvature, either positive or negative as viewed from an object side of the lens system 10, 20 helps to balance aberrations created as the lens system 10, 20 moves between the wide angle and telephoto zoom positions. Additional compensation provided by lens group G2 also helps to balance the lens system 10 through the zoom range.

Figure 1B:
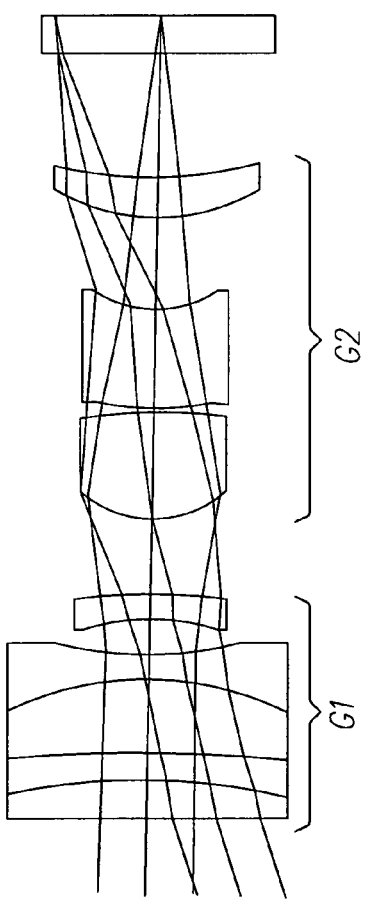
Figure 1C:
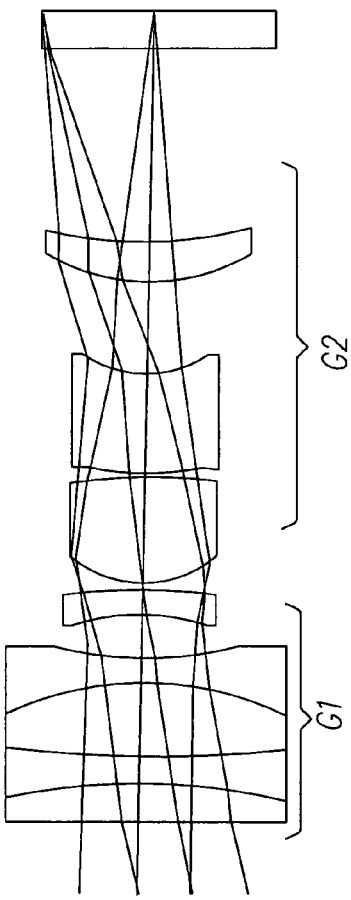

Referring to FIGS. 1A, 1B, and 1C, as viewed from an object side of the lens system 10, lens group G1 has a variable power lens element that includes a bi-convex faceplate R1, R2, and bi-concave faceplate R4, R5. Liquids L1, L2 located between faceplates R1, R2, and R4, R5 create variable boundary, surface R3. Liquid L1 has a refractive index of 1.33 and an Abbe-number (v) of 57.1. Liquid L2 has a refractive index of 1.52 and Abbe-number of 35.0.

Lens group G1 also includes a meniscus lens element, surfaces R6, R7 convex toward an image side of the lens system. Inclusion of additional lenses in lens group G1 is application dependent and, as such, more than one additional lens element can be included. For example, a negative powered lens element can be included on an object side of the variable power lens element which can help to reduce the diameter of the lens or lenses included in lens group G1. Alternatively, no additional lens elements need to be included in lens group G1.

As viewed from an object side of the lens system 10, lens group G2 includes aperture stop R8 followed by a bi-convex lens R9, R10. Two meniscus lens elements R11, R12 and R13, R14 are also included in lens group G2. Lens choice in lens group G2 is application dependent and, as such, any number of lens elements can be included in lens group G2 depending on the desired performance of the lens system 10.

Figure 2A:
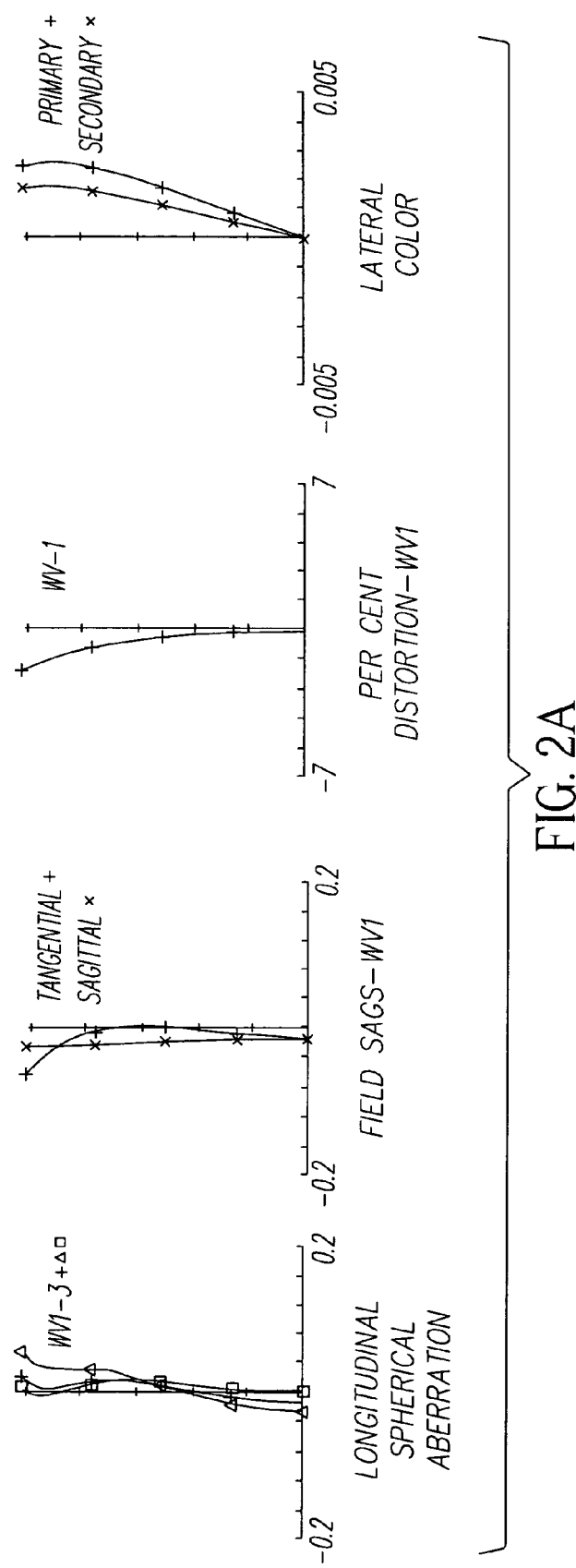
FIGS. 2A, 2B, and 2C are the aberration diagrams of the example embodiment shown in FIGS. 1A, 1B, and 1C, respectively, focused at infinity.
Figure 2B:
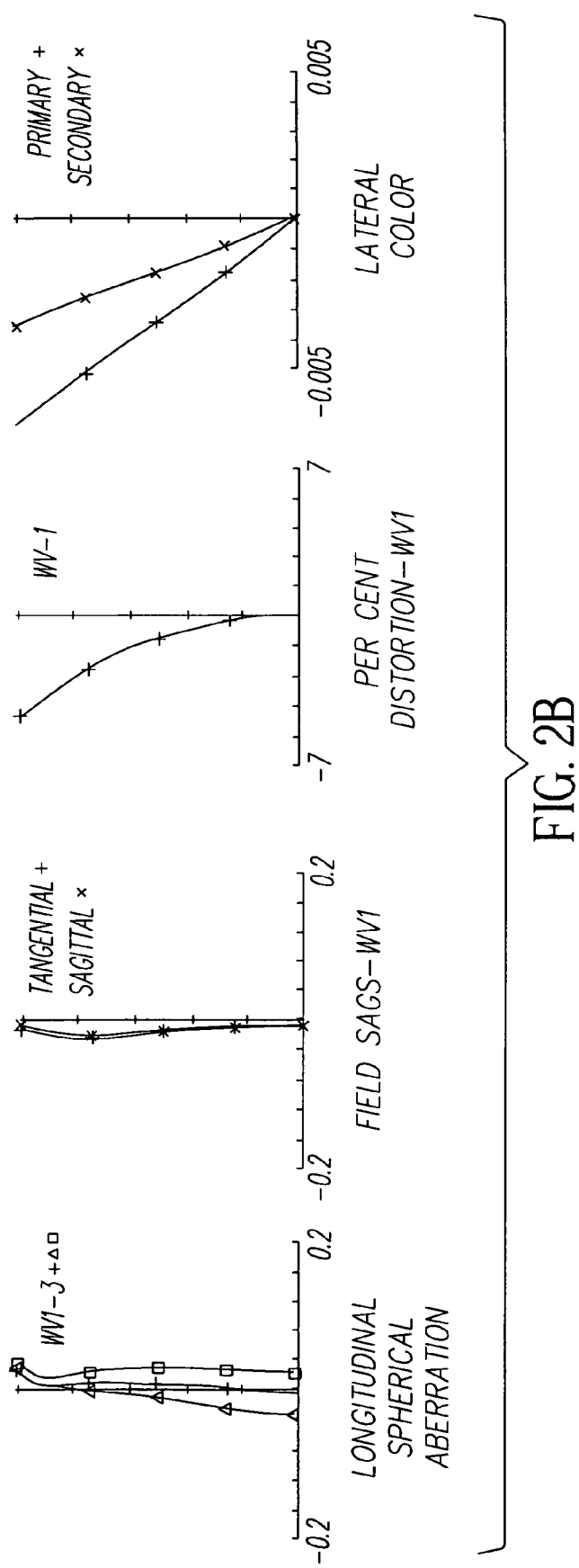
Figure 2C:
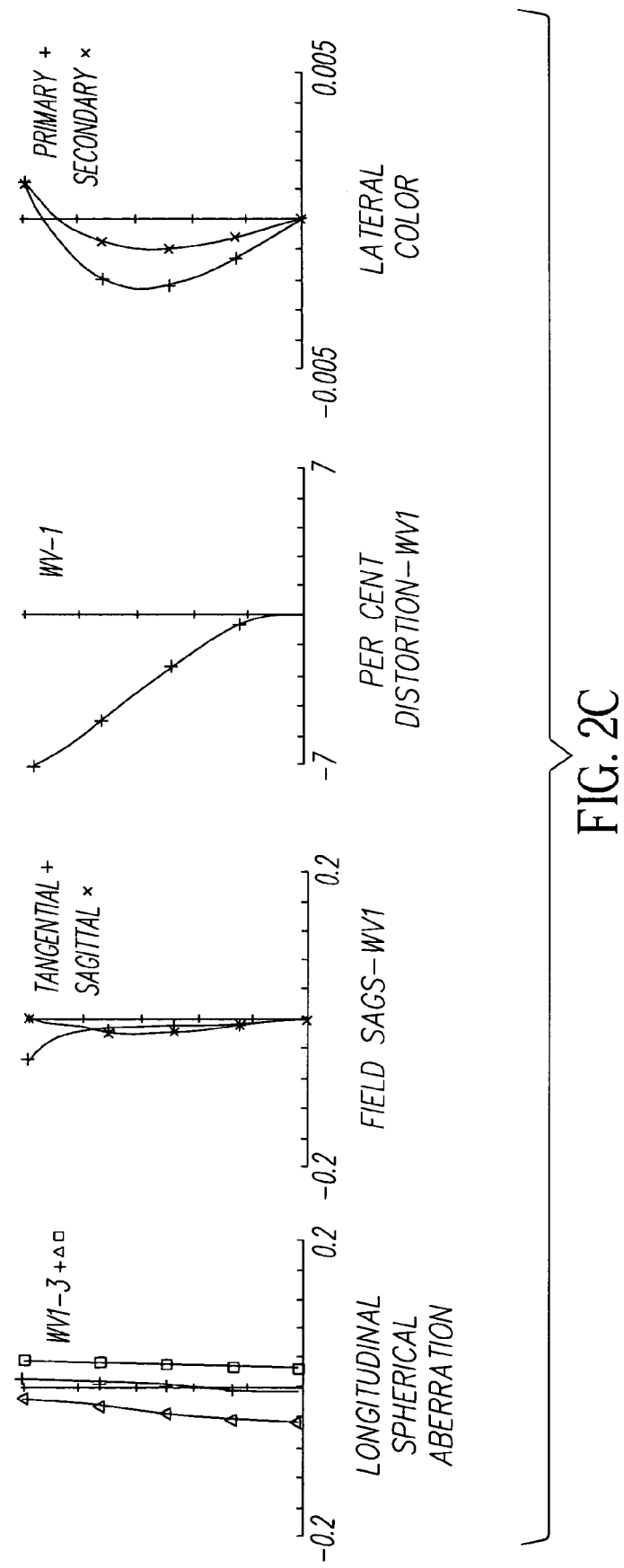

In FIGS. 2A, 2B, and 2C, aberration diagrams for the example embodiment shown in FIGS. 1A, 1B, and 1C, respectively, focused at infinity, are shown. As can be determined from these diagrams, aberrations, for example, astigmatism, are acceptably controlled across the zoom range even though the radius of curvature of surface R3 varies from 37.8 to −93.9 mm as the focal length of the lens system 10 changes.

Figure 3A:
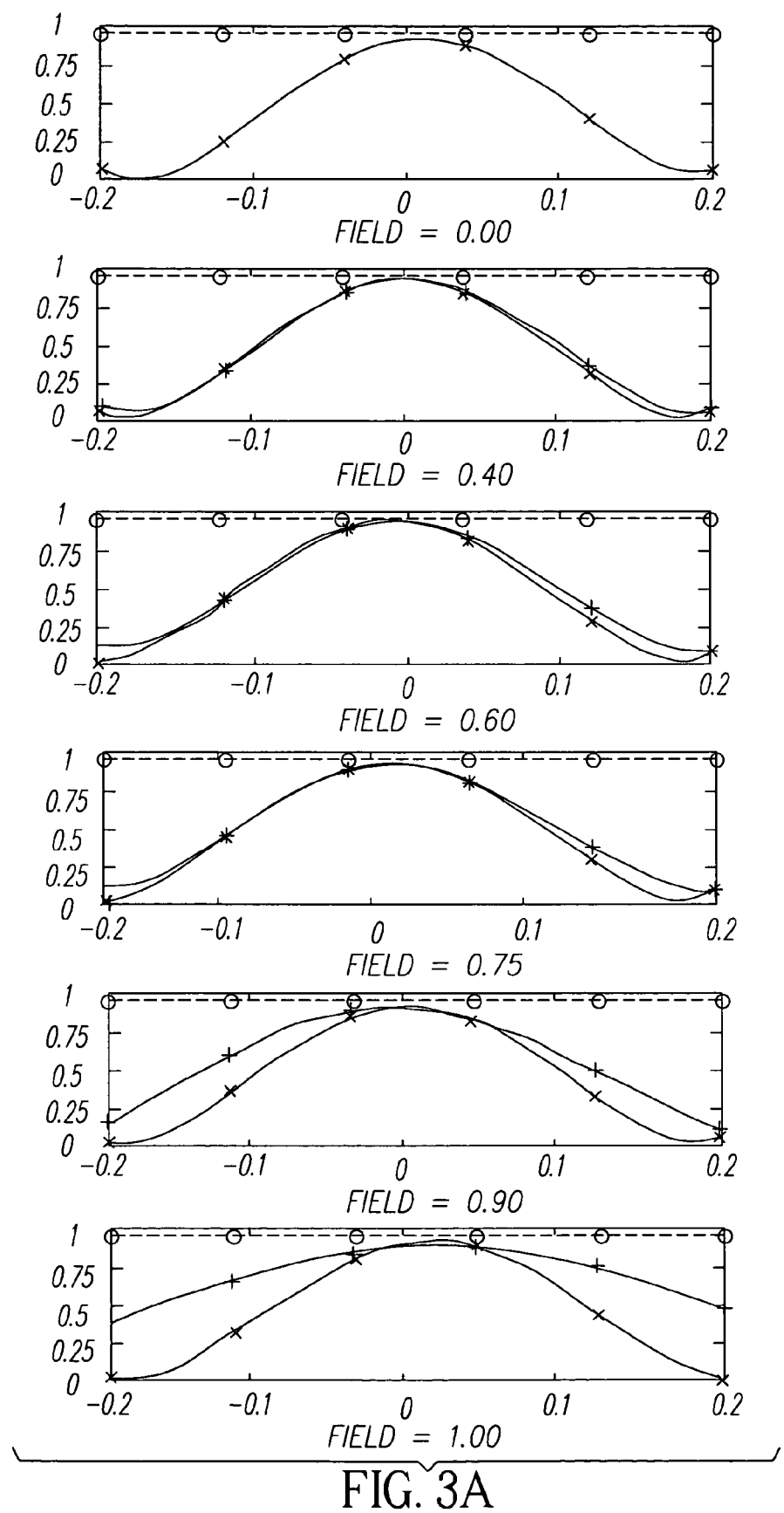
FIGS. 3A, 3B, and 3C are the through focus MTF plots at 20 cycles/mm for the example embodiment shown in FIGS. 1A, 1B, and 1C, respectively, at infinite conjugates with axial data being located at the top of the plots and full field data being located at the bottom of the plots.
Figure 3B:
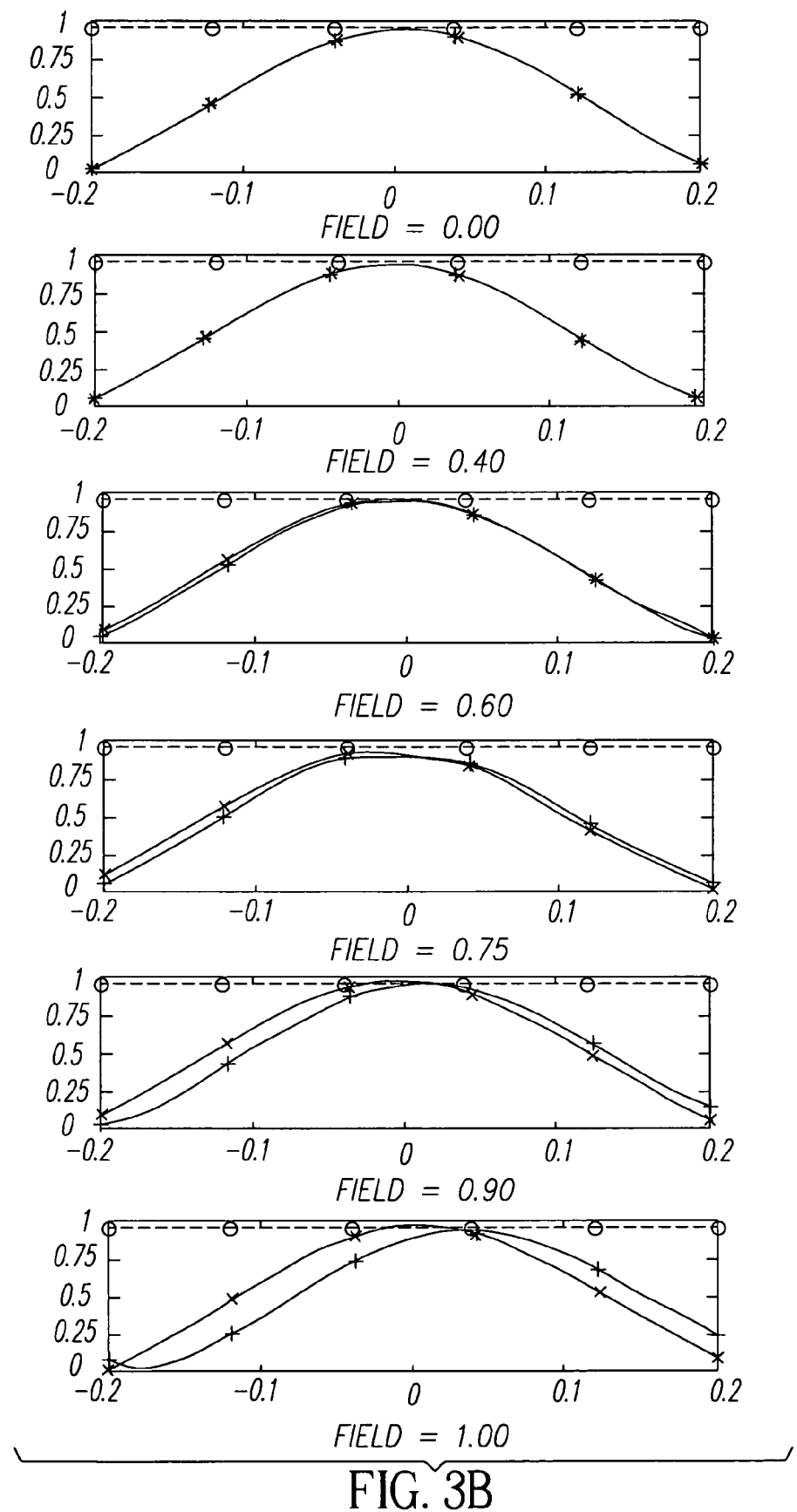
Figure 3C:
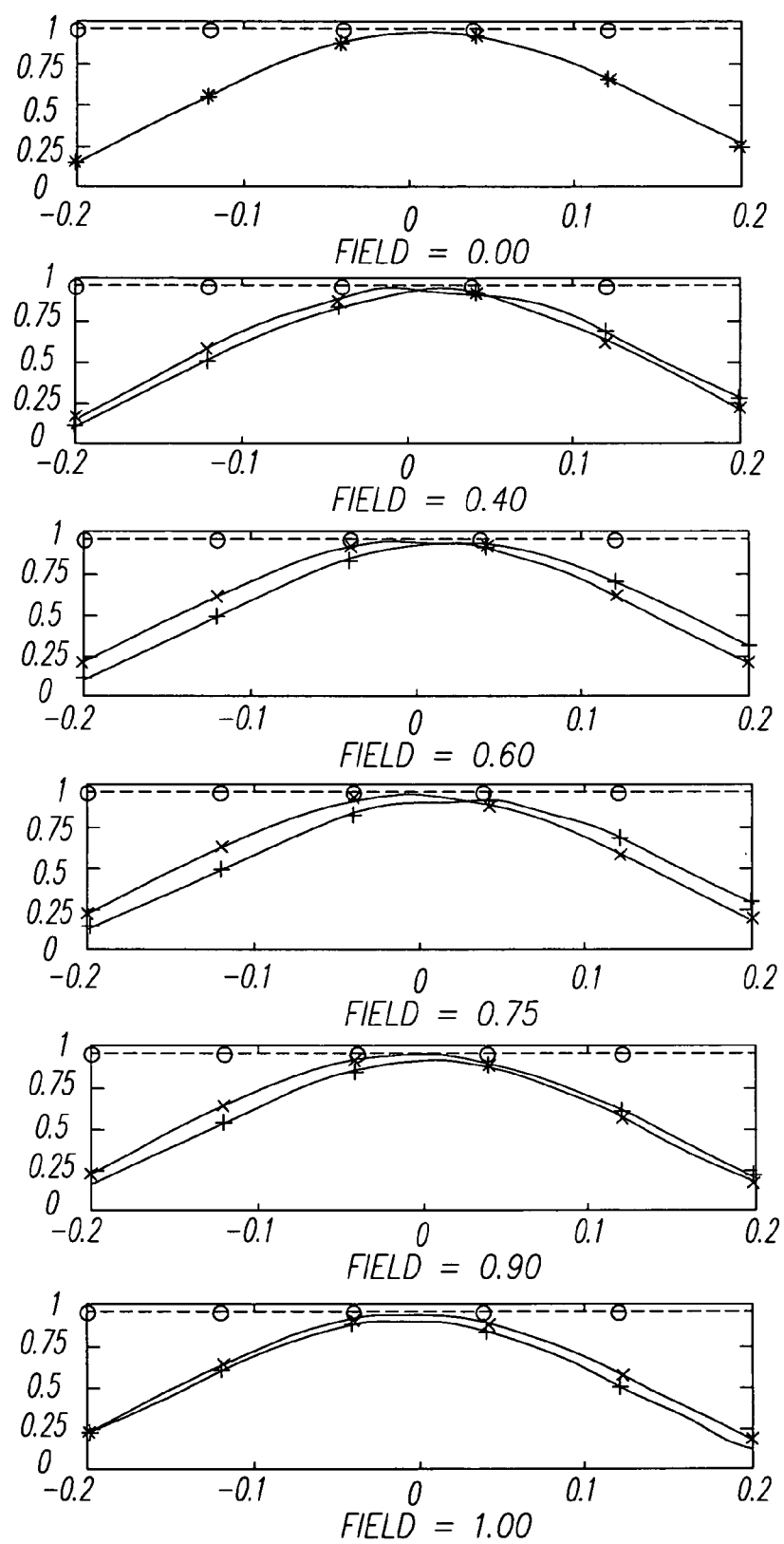
Figure 4A:
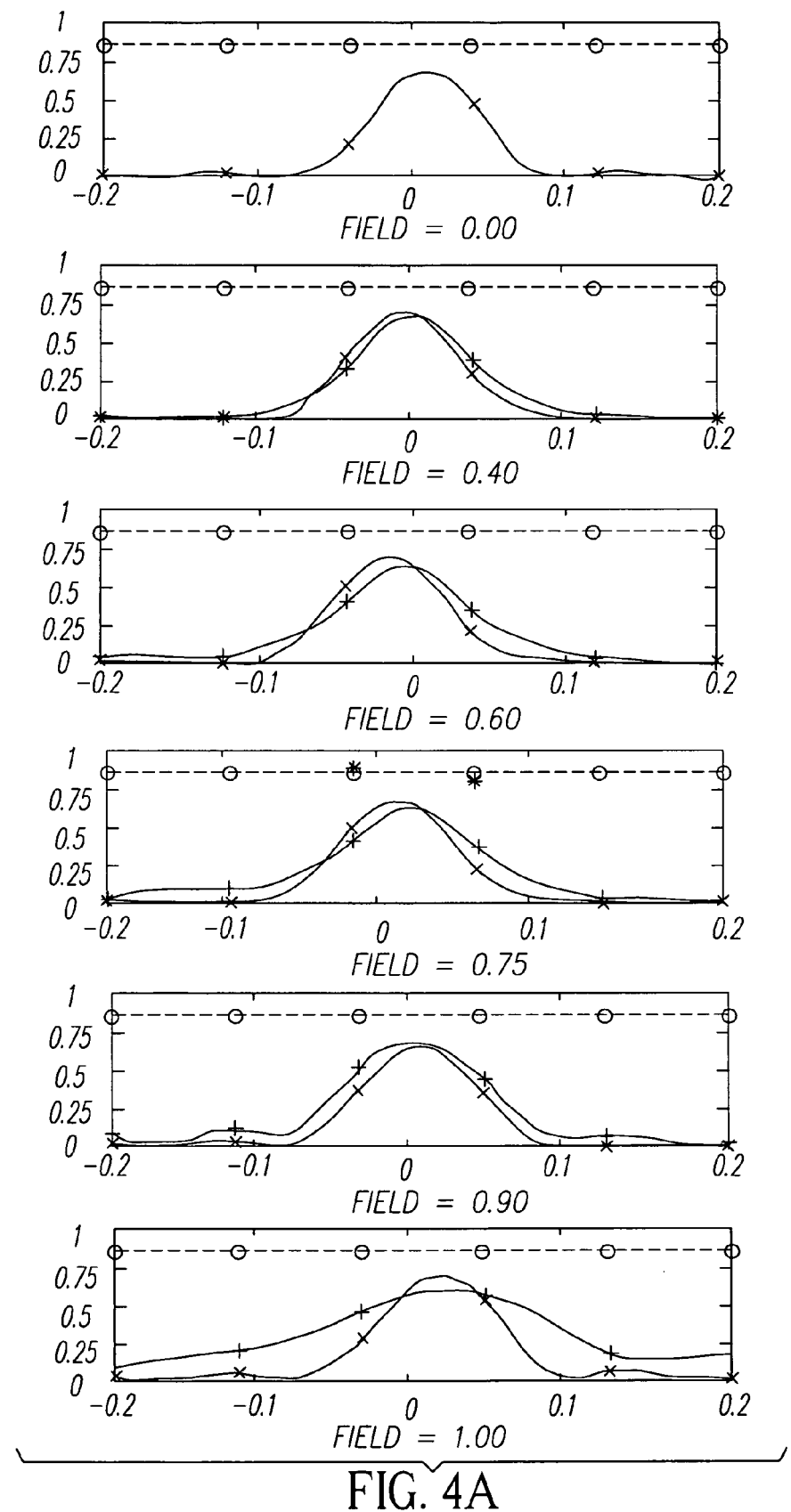
FIGS. 4A, 4B, and 4C are the through focus MTF plots at 60 cycles/mm for the example embodiment shown in FIGS. 1A, 1B, and 1C, respectively, at infinite conjugates with axial data being located at the top of the plots and full field data being located at the bottom of the plots.
Figure 4B:
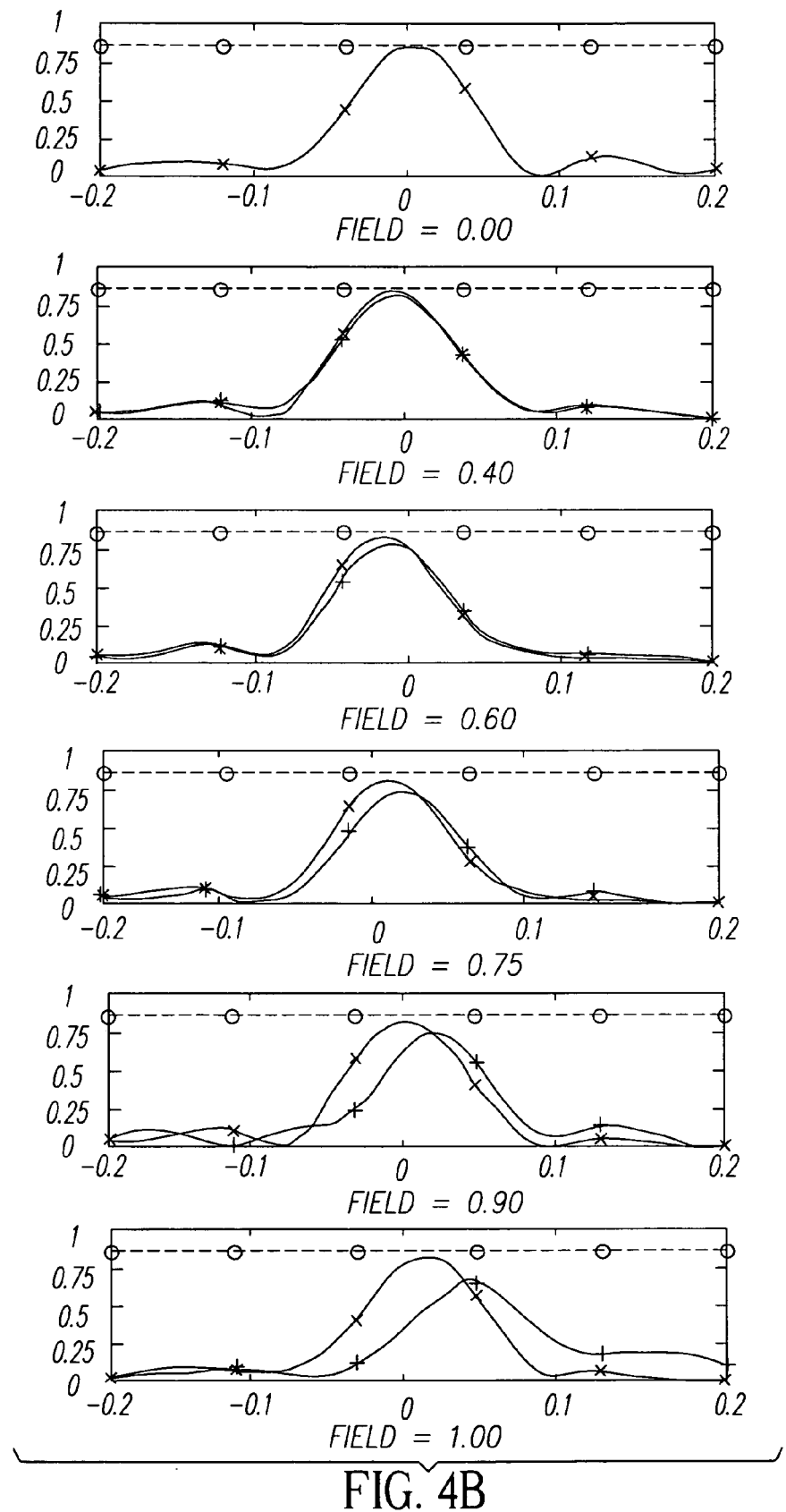
Figure 4C:
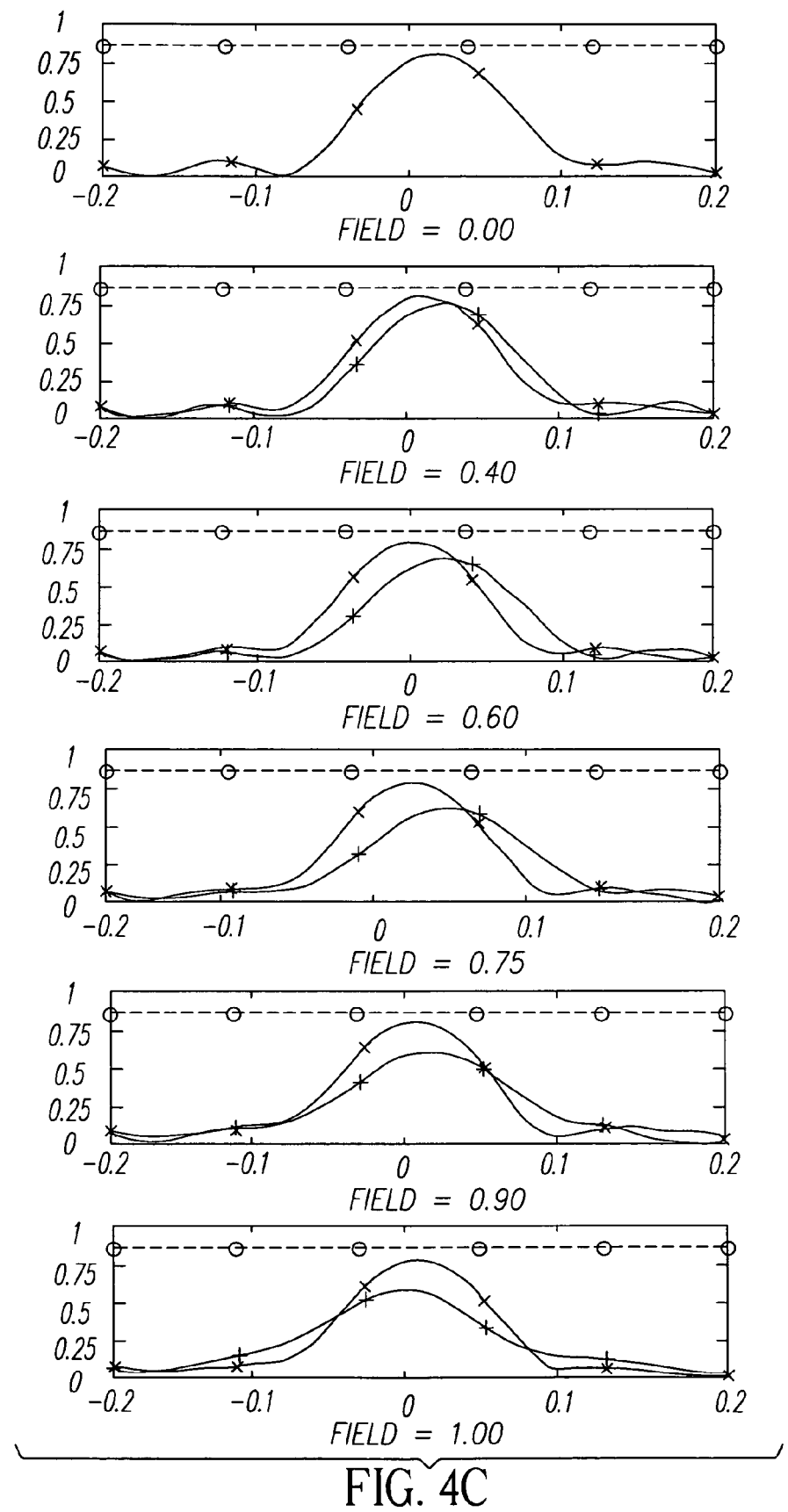

In FIGS. 3A, 3B, and 3C, through focus MTF plots at 20 cycles/mm for the example embodiment shown in FIGS. 1A, 1B, and 1C, respectively, at infinite conjugates with axial data being located at the top of the plots and full field data being located at the bottom of the plots are shown. In FIGS. 4A, 4B, and 4C, through focus MTF plots at 60 cycles/mm for the example embodiment shown in FIGS. 1A, 1B, and 1C, respectively, at infinite conjugates with axial data being located at the top of the plots and full field data being located at the bottom of the plots are shown. Again, as can be determined from these plots, aberrations are acceptably controlled across the zoom range of the lens system with a reduced number of moving groups as compared to similar conventional zoom lens systems.

TABLE 1 provides an example prescription for the first example embodiment shown in FIGS. 1A, 1B, and 1C.

TABLE 1

| F = 5.75~8.15~11.58 FNO = 2.8~3.35~4.0 w = 27.7~19.8~13.8 | | | |
|---|---|---|---|
| R1 = 235.20 | D1 = 1.02 | N1 = 1.78472 | V1 = 25.7 |
| R2 = −16.63 | D2 = 0.64 | N2 = 1.33304 | V2 = 57.1 |
| R3 = variable | D3 = 1.76 | N3 = 1.52000 | V3 = 35.0 |
| R4 = −9.33 | D4 = 0.60 | N4 = 1.88300 | V4 = 40.8 |
| R5 = 13.73 | D5 = 0.86 | | |
| R6 = −5.80 | D6 = 0.60 | N6 = 1.84666 | V6 = 23.8 |
| R7 = −9.89 | D7 = variable | | |
| R8 = 0.00 | D8 = 0.10 | | |
| R9 = 2.97 | D9 = 2.60 | N9 = 1.51633 | V9 = 64.1 |
| R10 = −14.10 | D10 = 0.10 | | |
| R11 = 6.19 | D11 = 2.50 | N11 = 1.84666 | V11 = 23.8 |
| R12 = 2.72 | D12 = 2.31 | | |
| R13 = 5.68 | D13 = 0.98 | N13 = 1.70154 | V13 = 41.2 |
| R14 = 12.46 | D14 = variable | | |
| R15 = 0.00 | D15 = 0.85 | N15 = 1.51680 | V15 = 64.2 |
| R16 = 0.00 | D16 = 0.00 | | |

| Focal length | R3 | D7 | D14 |
|---|---|---|---|
| 5.75 | 10.29 | 4.23 | 0.86 |
| 8.15 | −93.94 | 1.97 | 3.12 |
| 11.58 | 37.18 | 0.30 | 4.79 |

Aspheric Equation:

$$X = \frac{CY^2}{1 + \sqrt{1 - (k+1)C^2Y^2}} + A4Y^4 + A6Y^6 + A8Y^8 + A10Y^{10} + A12Y^{12} + A14Y^{14}$$

Aspheric Data for surface 7:
A4=−0.189533E-03 A6=0.227901E-03 A8=−0.167431E-03 A10=0.612888E-04
A12=−0.114247E-04 A14=0.829094E-06

Aspheric Data for surface 11:
A4=−0.904992E-02 A6=−0.648737E-03 A8=−0.575906E-03 A10=0.258500E-03
A12=−0.795055E-04 A14=0.755727E-05

Aspheric Data for surface 12:
A4=−0.967461E-02 A6=−0.201302E-02 A8=0.560703E-03 A10=−0.243058E-03
A12=0.567225E-04 A14=−0.204143E-05

Referring to FIGS. 5A, 5B, and 5C, as viewed from an object side of a lens system 20, lens group G1 has a variable power lens element that includes a bi-convex faceplate R1, R2, and a meniscus faceplate R4, R5 convex toward the object side. Liquids L1, L2 located between faceplates R1, R2, and R4, R5 create variable boundary, surface R3. Liquid L1 has a refractive index of 1.48 and an Abbe-number (v) of 58.7. Liquid L2 has a refractive index of 1.64 and Abbe-number of 40.8.

In the second example embodiment, the liquids used in the variable power lens element are different from the liquids used in the first example embodiment. In the second example embodiment, the performance of the lens was further improved over the first example embodiment by using liquids with a higher refractive index. Additionally, by using increased refractive indices in the lenses of the second example embodiment, the curvature of the lenses is reduced which helps to reduce astigmatism while improving the manufacturability of the lenses.

The freedom to select the refractive indices of the liquids provides additional advantages when designing a zoom lens made in accordance with the present invention. As described above, inherent astigmatism can be controlled by shaping the faceplates rather than using plane parallel plates. The availability of a range of refractive indices allows the lens designer to determine several acceptable faceplate shape factors and thus have the freedom to select the most manufacturing friendly option. Additionally, the disclosed example embodiments demonstrate that utilizing a higher refractive index (N>1.6) for at least one of the liquids can produce desirable effects. For example, the primary lateral color in the middle zoom position of the second example embodiment is significantly reduced resulting in somewhat higher tangential MTF performance and less color fringing. Also, the shape of the rear faceplate in the second example embodiment can be allowed to move from a weighty biconcave lens shape (as shown in the first example embodiment) to a relatively simple meniscus lens shape (as shown in the second example embodiment).

Lens group G1 also includes a meniscus lens element, surfaces R6, R7 convex toward an image side of the lens system. Inclusion of additional lenses in lens group G1 is application dependent and, as such, more than one additional lens element can be included. For example, a negative powered lens element can be included on an object side of the variable power lens element which can help to reduce the diameter of the lens or lenses included in lens group G1. Alternatively, no additional lens elements need to be included in lens group G1.

As viewed from an object side of the lens system 20, lens group G2 includes aperture stop R8 followed by a bi-convex lens R9, R10. Two meniscus lens elements R11, R12 and R13, R14 are also included in lens group G2. Lens choice in lens group G2 is application dependent and, as such, any number of lens elements can be included in lens group G2 depending on the desired performance of the lens system 20.

Figure 6A:
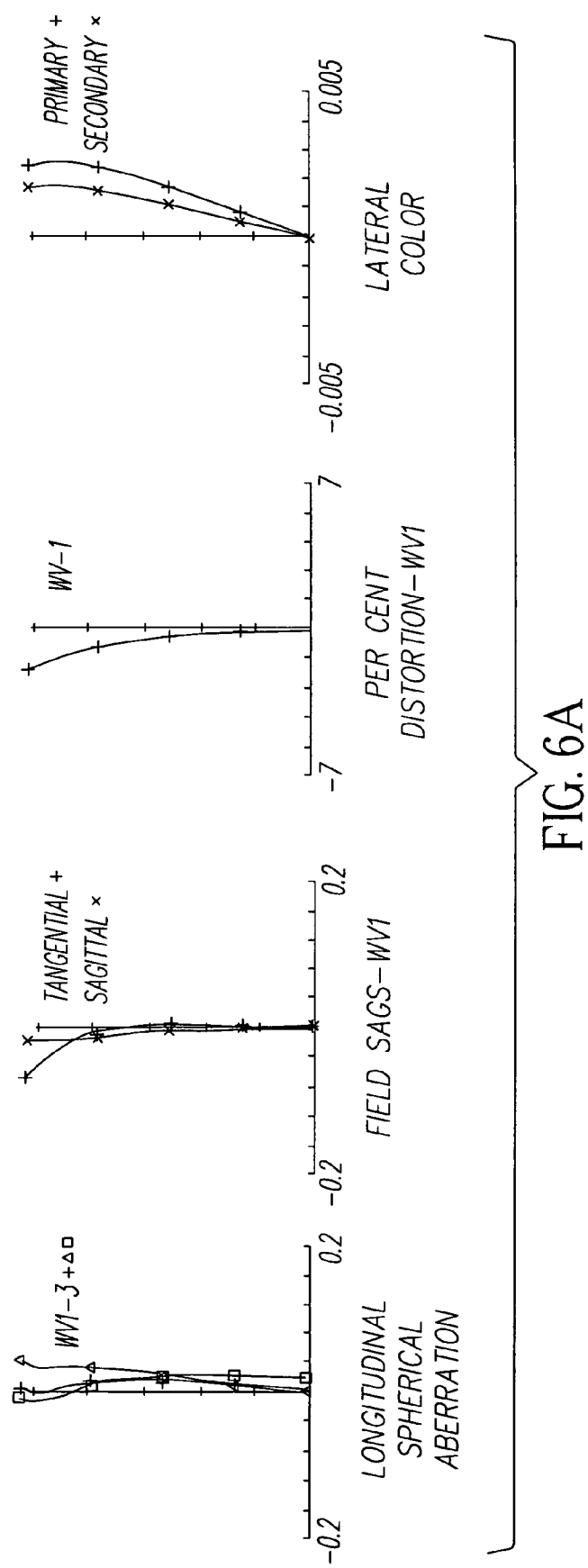
FIGS. 6A, 6B, and 6C are the aberration diagrams of the example embodiment shown in FIGS. 5A, 5B, and 5C, respectively, focused at infinity.
Figure 6B:
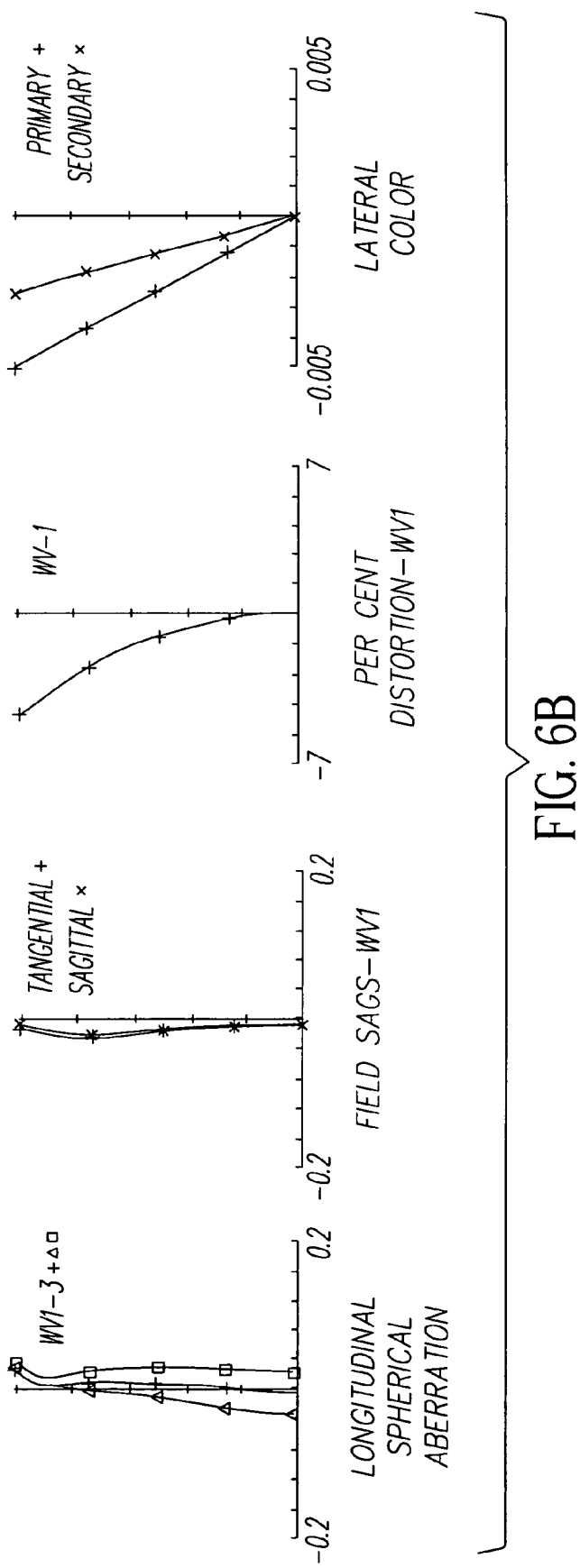
Figure 6C:
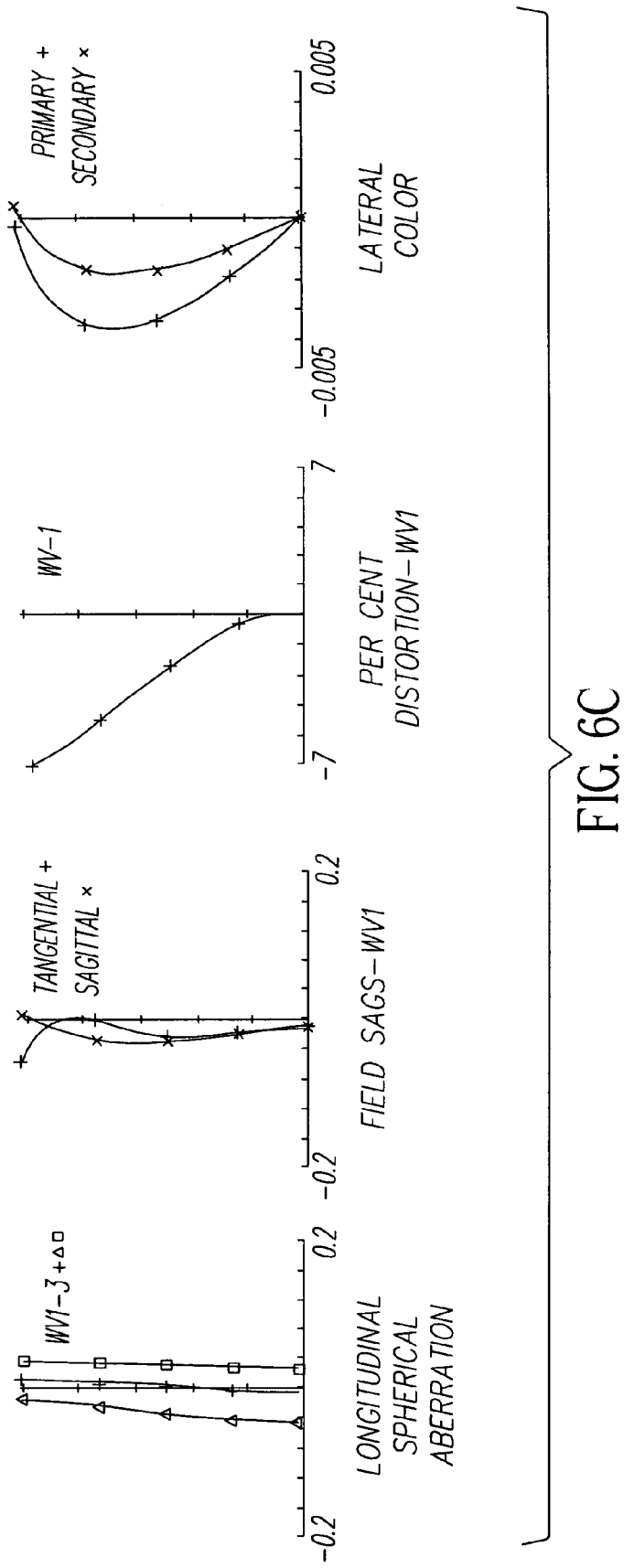

In FIGS. 6A, 6B, and 6C, aberration diagrams of the example embodiment shown in FIGS. 5A, 5B, and 5C, respectively, focused at infinity are shown. As can be determined from these diagrams, aberrations, for example, astigmatism, are acceptably controlled across the zoom range even though the radius of curvature of surface R3 varies in shape between negative and positive millimeter radii as the focal length of the lens system 20 changes.

Figure 7A:
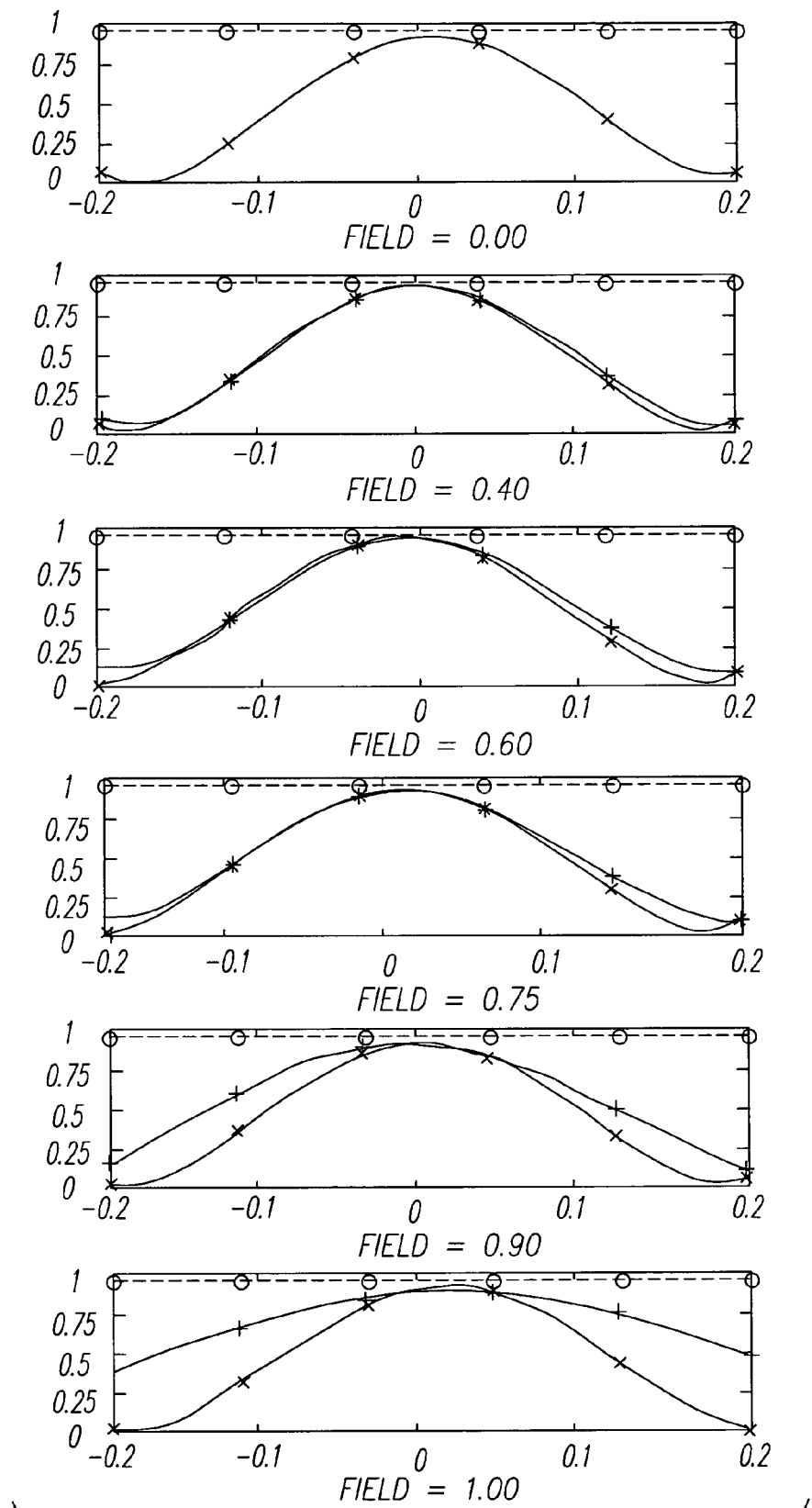
FIGS. 7A, 7B, and 7C are the through focus MTF plots at 20 cycles/mm for the example embodiment shown in FIGS. 5A, 5B, and 5C, respectively, at infinite conjugates with axial data being located at the top of the plots and full field data being located at the bottom of the plots.
Figure 7B:
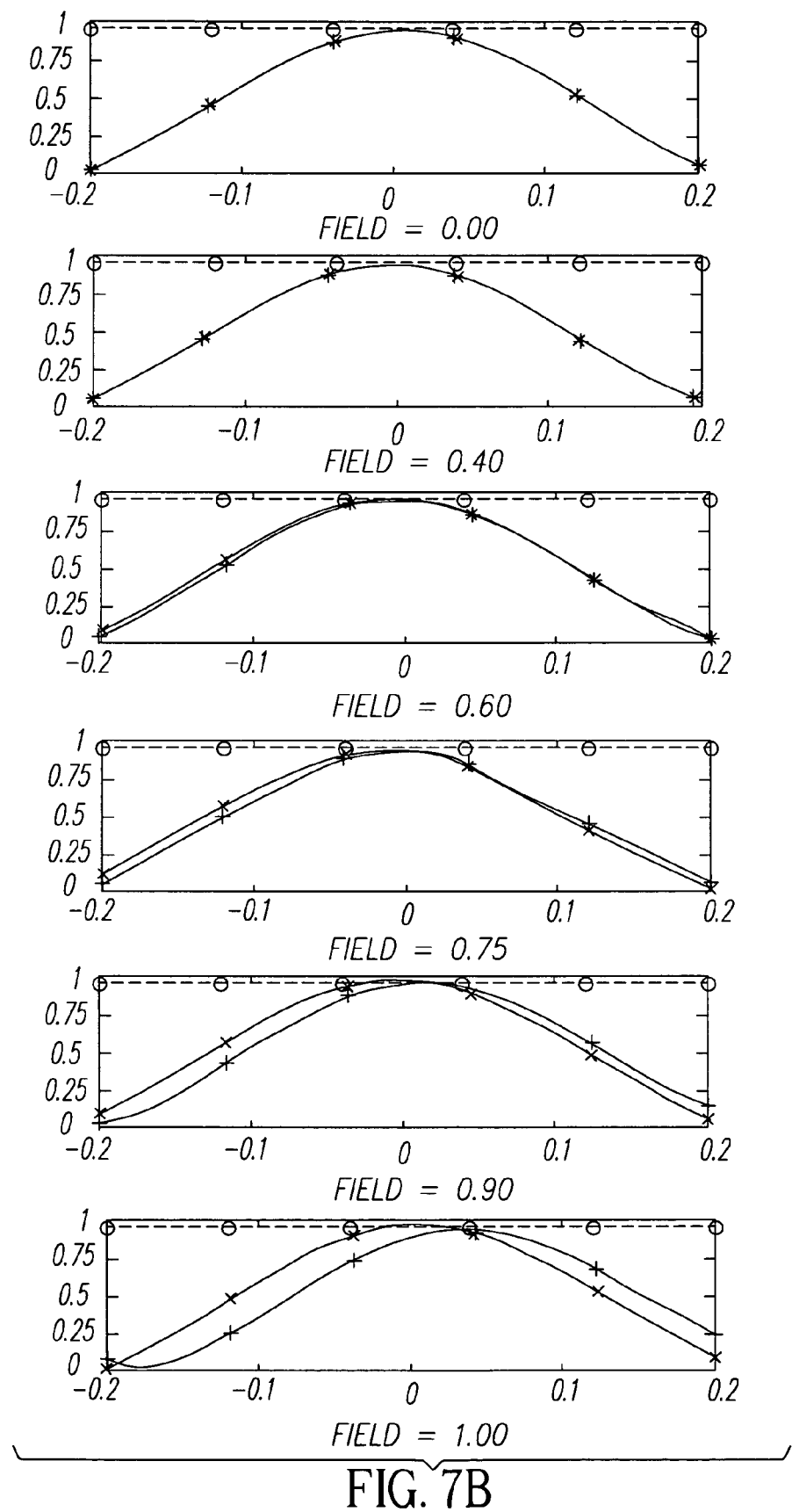
Figure 7C:
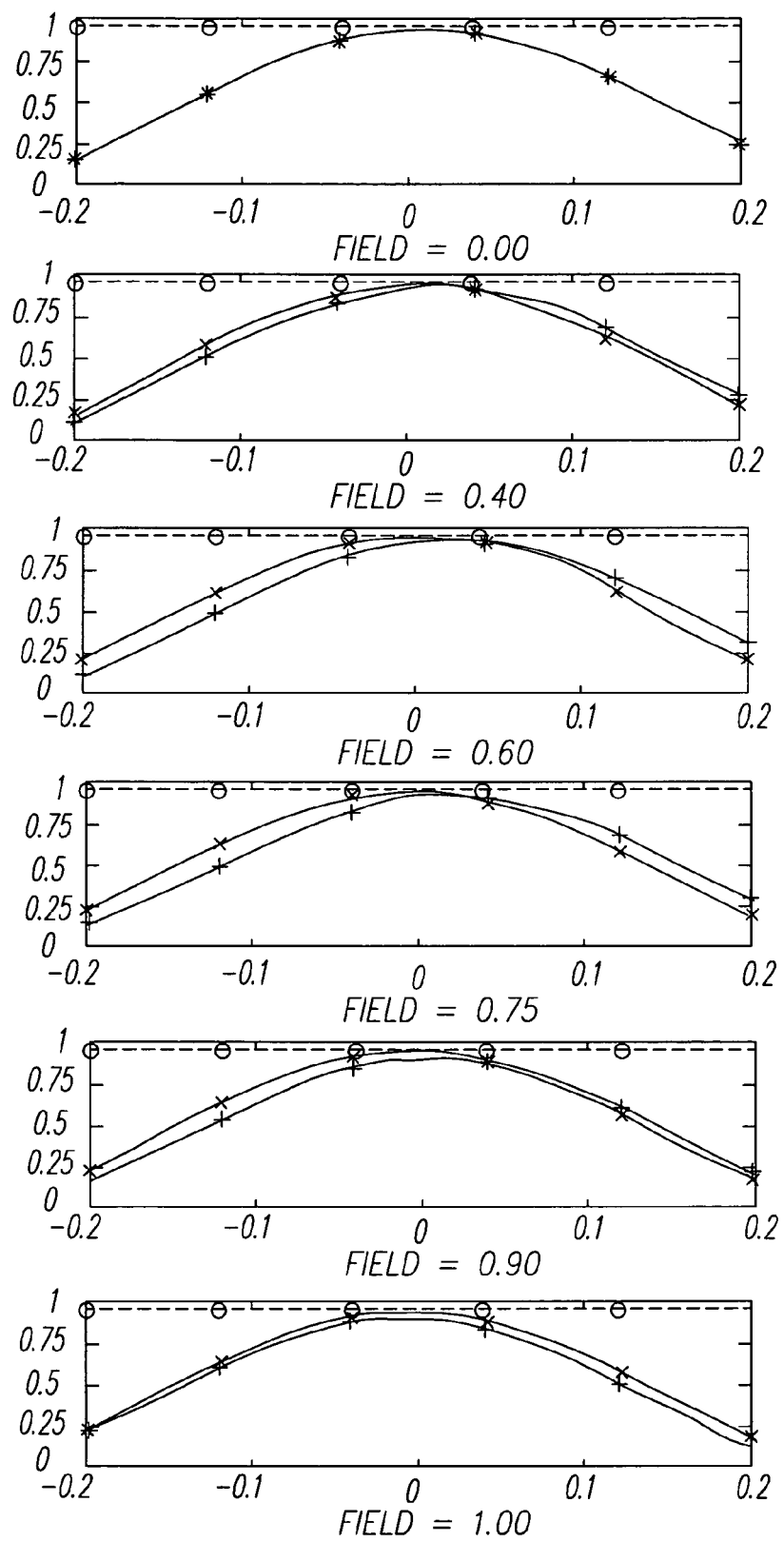
Figure 8A:
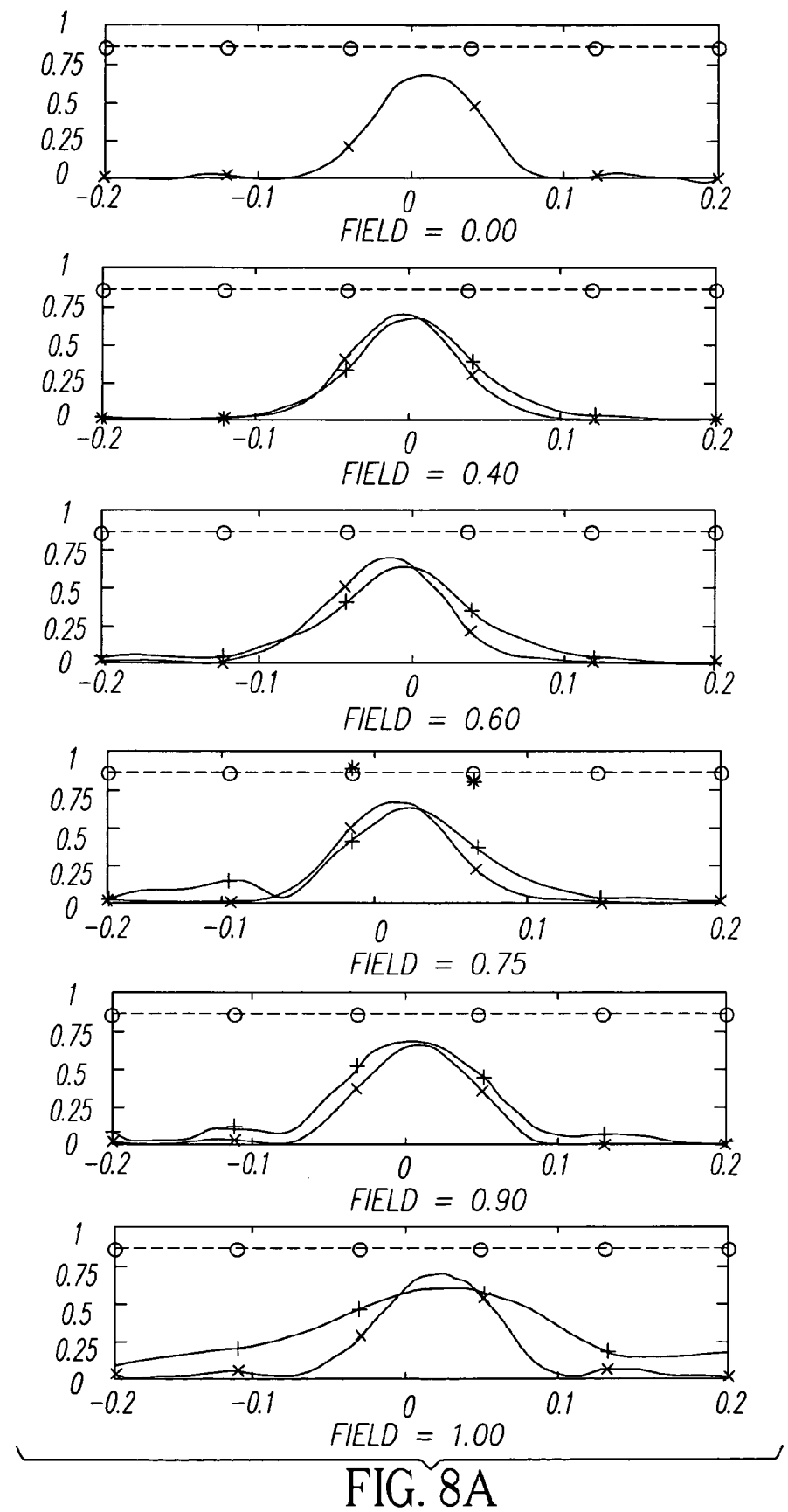
FIGS. 8A, 8B, and 8C are the through focus MTF plots at 60 cycles/mm for the example embodiment shown in FIGS. 5A, 5B, and 5C, respectively, at infinite conjugates with axial data being located at the top of the plots and full field data being located at the bottom of the plots.
Figure 8B:
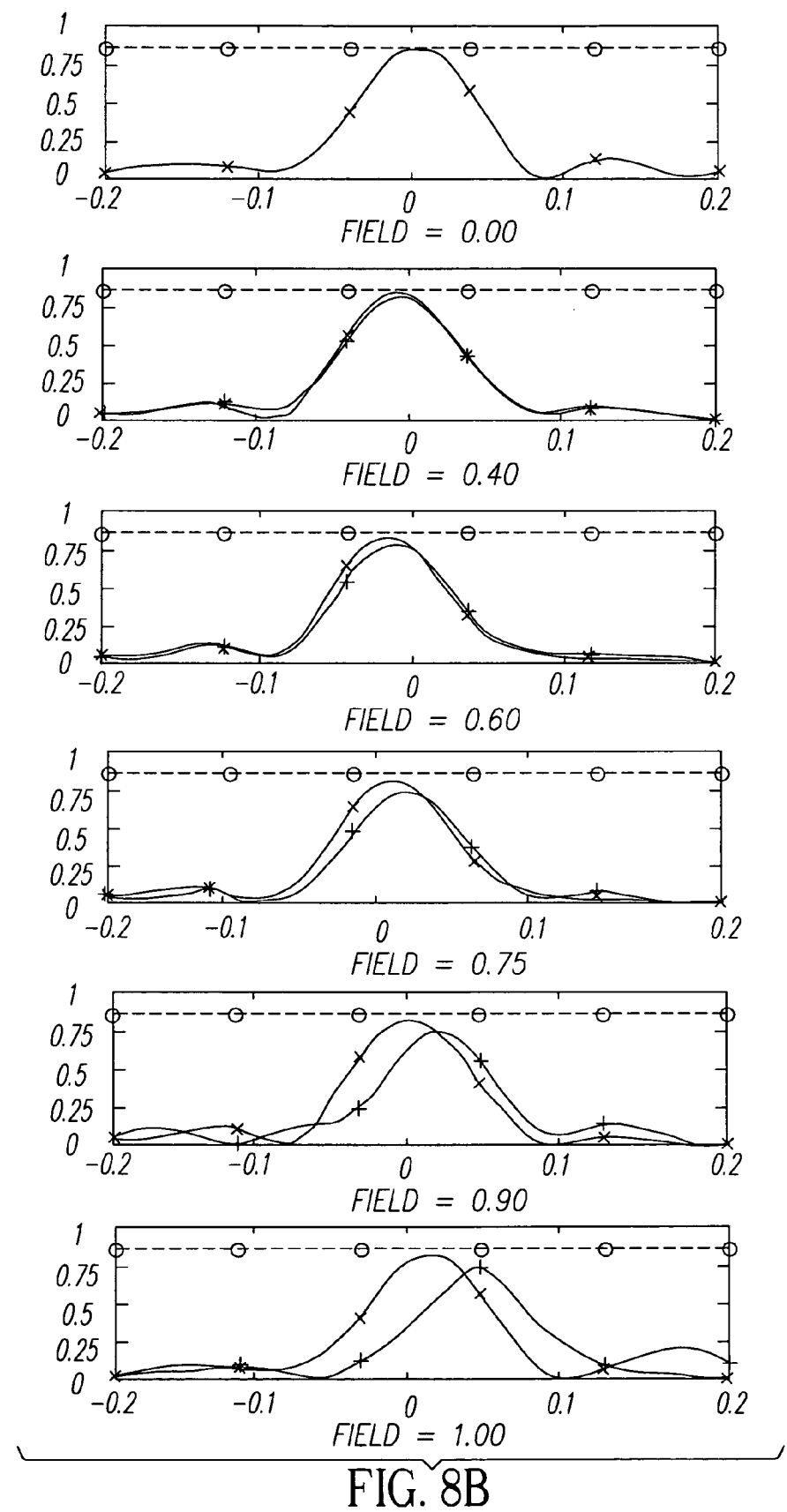
Figure 8C:
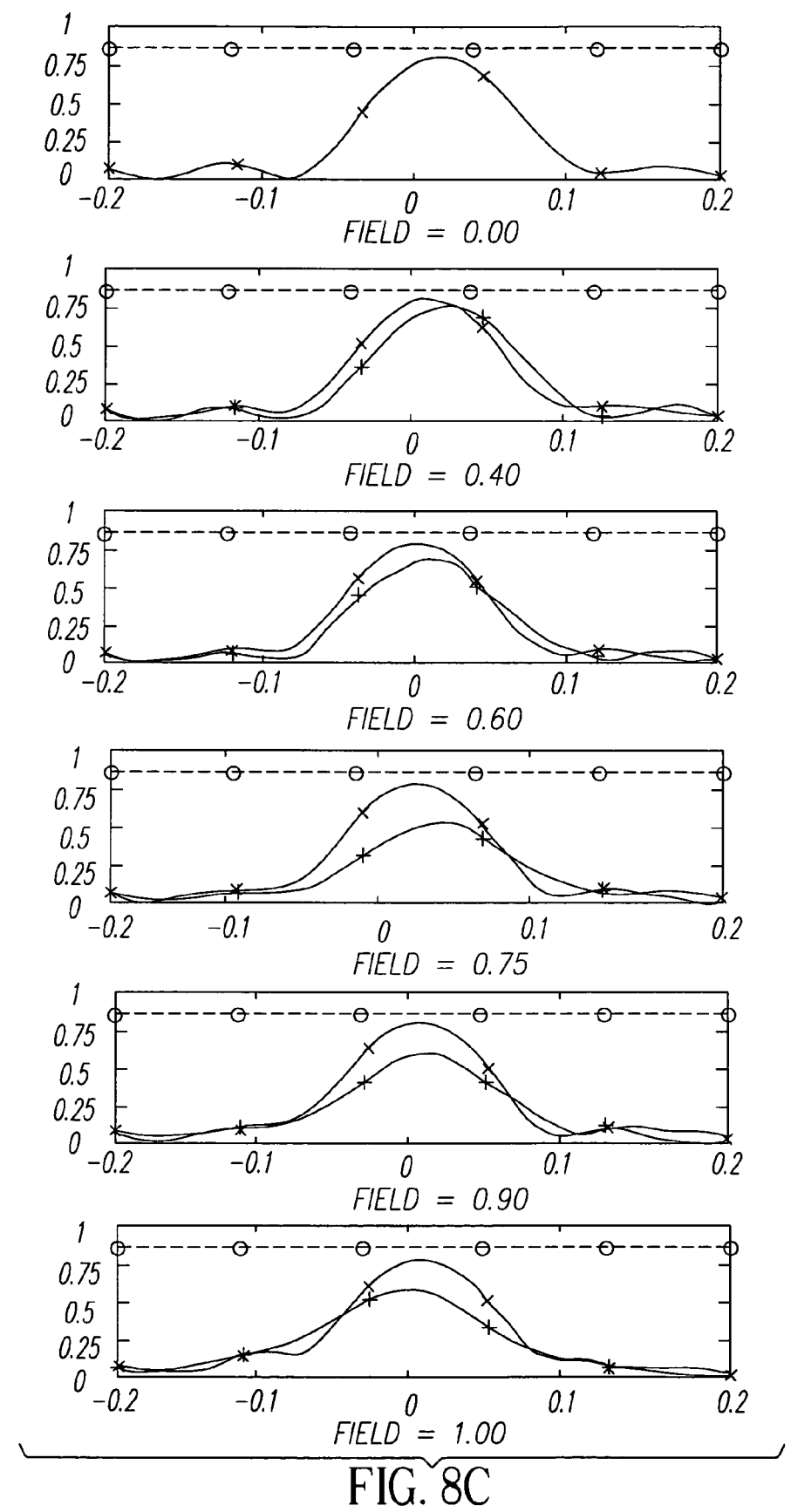

In FIGS. 7A, 7B, and 7C, through focus MTF plots at 20 cycles/mm for the example embodiment shown in FIGS. 5A, 5B, and 5C, respectively, at infinite conjugates with axial data being located at the top of the plots and full field data being located at the bottom of the plots are shown. In FIGS. 8A, 8B, and 8C are the through focus MTF plots at 60 cycles/mm for the example embodiment shown in FIGS. 5A, 5B, and 5C, respectively, at infinite conjugates with axial data being located at the top of the plots and full field data being located at the bottom of the plots are shown. Again, as can be determined from these plots, aberrations are acceptably controlled across the zoom range of the lens system with a reduced number of moving groups as compared to similar conventional zoom lens systems.

TABLE 2 provides an example prescription for the second example embodiment shown in FIGS. 5A, 5B, and 5C.

TABLE 2

F = 5.73~8.15~11.58 FNO = 2.8~3.35~4.0 w = 27.7~19.8~13.9

| | | | |
|---|---|---|---|
| R1 = 235.20 | D1 = 1.15 | N1 = 1.78472 | V1 = 25.7 |
| R2 = −13.84 | D2 = 0.60 | N2 = 1.47856 | V2 = 58.7 |
| R3 = variable | D3 = 1.41 | N3 = 1.64247 | V3 = 56.3 |
| R4 = 12.22 | D4 = 0.60 | N4 = 1.88300 | V4 = 40.8 |
| R5 = 10.24 | D5 = 1.05 | | |
| R6 = −5.67 | D6 = 0.60 | N6 = 1.84666 | V6 = 23.8 |
| R7 = −11.81 | D7 = variable | | |
| R8 = 0.00 | D8 = 0.10 | | |
| R9 = 2.99 | D9 = 2.60 | N9 = 1.51633 | V9 = 64.1 |
| R10 = −15.79 | D10 = 0.10 | | |
| R11 = 5.75 | D11 = 2.17 | N11 = 1.84666 | V11 = 23.8 |
| R12 = 2.78 | D12 = 2.49 | | |
| R13 = 5.89 | D13 = 0.97 | N13 = 1.70154 | V13 = 41.2 |
| R14 = 12.74 | D14 = variable | | |
| R15 = 0.00 | D15 = 0.85 | N15 = 1.51680 | V15 = 64.2 |
| R16 = 0.00 | D16 = 0.00 | | |

| Focal length | R3 | D7 | D14 |
|---|---|---|---|
| 5.75 | 6.92 | 4.73 | 0.59 |
| 8.15 | −20.67 | 2.04 | 3.27 |
| 11.58 | −63.57 | 0.30 | 5.02 |

Aspheric Equation:

$$X = \frac{CY^2}{1 + \sqrt{1 - (k+1)C^2Y^2}} + A4Y^4 + A6Y^6 + A8Y^8 + A10Y^{10} + A12Y^{12} + A14Y^{14}$$

Aspheric Data for surface 7:
A4=−0.108221E-03 A6=0.170981E-04 A8=0.625360E-05 A10=−0.692886E-05
A12=0.124822E-05 A14=−0.704853E-07

Aspheric Data for surface 11:
A4=−0.906079E-02 A6=−0.944288E-03 A8=−0.290328E-03 A10=0.114480E-03
A12=−0.424580E-04 A14=0.405850E-05

Aspheric Data for surface 12:
A4=−0.934826E-02 A6=−0.199116E-02 A8=0.576762E-03 A10=−0.273293E-03
A12=0.728011E-04 A14=−0.517385E-05

In the example embodiments described above, the electrically controllable liquid lens includes liquids having the following characteristics. Both liquids are immiscible with equivalent or approximately equivalent densities, the liquids should have different refractive indices with one liquid being conductive and one liquid being an insulator. Additionally, neither liquid should freeze, boil or outgas within normal operating conditions. The liquids should be of sufficiently low viscosity to enable a fast change in curvature at the interface between the liquids and should have a transparency and/or lack of color characteristic(s).

While the liquids should have different refractive indices from one another, it was found that, in the example embodiments described above, the index of refraction of one liquid should be between 85% to 95% of the index of refraction of the other liquid and, more preferably approximately 90% of the other liquid. In the second example embodiment, at least one of the liquids has an index of refraction greater than 1.60. Table 3 provides a list of insulating liquids with high refractive indices (N>1.6) that are immiscible with water and have freezing and boiling points that are outside the typical operating range of, for example, a digital or film camera or video device (−20° C. to 60° C.). The liquids listed in Table 3 are representative. As such, it should be understood that other liquids can be used.

TABLE 3

| Compound | Refractive index | Density (g/mL) | Freezing point (° C.) | Boiling point (° C.) |
|---|---|---|---|---|
| Phenyl isothiocyanate | 1.649 | 1.13 | −21 | 221 |
| Diphenyl sulfide | 1.633 | 1.114 | −25.9 | 296 |
| 2-iodothiophene | 1.646 | 1.9 | −40 | 180 |
| 3-iodotoluene | 1.605 | 1.705 | −27.2 | 213 |
| Iodobenzene | 1.62 | 1.823 | −29 | 188 |
| 1-chloronaphthalene | 1.632 | 1.194 | −20 | 112 |

Given the many requirements of the characteristics of the liquids used in electrically controllable liquid lenses, it is advantageous to be able to adjust one or more of these characteristics substantially independently from other characteristics. For example, it is advantageous to independently adjust density and/or refractive index of one or both liquids in order to achieve the desired density match with the other liquid while simultaneously achieving the desired difference in refractive index between the two liquids.

Some of the prior art described above discloses adding salts or ionic components to increase conductivity and the addition of molecular constituents to increase the density of the liquid. Adding a salt to water, for example, increases at least one of the conductivity, density, and refractive index of water and suppresses the freezing point of water so the liquid does not freeze under normal operating conditions. However, the effects of the salt on the refractive index, density, and freezing point of water are interrelated so it can be difficult to adjust the density and the refractive index of water independently of each other. Similarly, a change in molecular constituents is accompanied by changes in refractive index, conductivity and freezing point. Table 4 shows a number of examples where the addition of salt to water increases its density, refractive index, and boiling point, and reduces its freezing point.

The present invention teaches the use of a composite approach to achieve a desired set of characteristics for each liquid used in the electrically controllable liquid lens described with reference to the first and second example embodiments. For example, mixtures of two or more salts can also be used to modify both the density and the refractive index of the liquid. Similarly, miscible liquids, for example, methanol, propanol, etc., can be added to the solution to adjust the density and freezing point of the liquid in the liquid lens without substantially changing the refractive index. Soluble compounds such as sucrose, for example, can also be used to modify the density and refractive index without changing the conductivity of the solution.

Table 4 provides a list of conductive salts, miscible liquids and soluble compounds that can be used to modify the density, the refractive index, and freezing point of water. The salts listed in Table 4 are representative. As such, it should be understood that other salts can be used.

TABLE 4

| Substance in Solution | % Loading (wt. salt/total wt.) | Density (g/mL) | Index of refraction (λ = 589.3 nm) | Freezing point (° C.) |
|---|---|---|---|---|
| Water baseline | 0 | 1 | 1.33 | 0 |
| Ammonium chloride | 10 | 1.03 | 1.352 | −7 |
| Ammonium hydroxide | 35 | 0.934 | 1.342 | 28.1 |
| Calcium chloride | 10 | 1.085 | 1.358 | −5.9 |
|  | 32 | 1.306 | 1.418 | −49.7 |
| Methanol | 30 | 0.953 | 1.341 | −25.9 |
| Potassium thiocyanate | 10 | 1.05 | 1.352 | −3.6 |
|  | 64 | 1.388 | 1.475 | −68.1* |
| Sodium chloride | 23 | 1.174 | 1.374 | −20.7 |
|  | 10 | 1.077 | 1.355 | −1.9 |
| Sodium dichromate | 48 | 1.489 | 1.468 | −19.7* |
| Sucrose | 42 | 1.187 | 1.404 | −4.9 |
| Zinc bromide | 79 | 2.5 | 1.565 | −91.8* |
| Zinc sulfate | 16 | 1.183 | 1.363 | −2.3 |

*Calculated freezing point

In another approach disclosed by the present invention, nanoparticles having a higher density than that of the liquid used in the lens and a refractive index that is matched to that of the liquid used in the lens can be added to at least one of the liquids used in the lens to form a composite liquid dispersion with a density that can be adjusted by varying the amount of high density nanoparticles added to the liquid. EP0911360, for example, discloses the use of refractive index matched particles in plastics to make injection molded optics having high transparency with improved stability with respect to temperature and humidity. In an electrically controllable liquid lens or lenses made in accordance with the present invention, refractive index matched nanoparticles can be added to one or both of the liquids used in the lens to create a liquid dispersion with an adjusted density as compared to the density of the liquid itself. The density of the liquid dispersion can be adjusted in order to produce matched densities between the liquid dispersion and the other liquid used in the electrically controllable liquid lens. By matching the density of the liquid dispersion to that of the other liquid, gravity induced instabilities are reduced or even avoided in the liquid lens.

Preferably, the refractive index matched nanoparticles are less than 100 nanometers in particle size so that a stable dispersion is created in which few or none of the nanoparticles settle out of the dispersion over time when a low viscosity liquid is used. It is also preferable that the refractive index matched nanoparticles have a refractive index that is within 0.05 of the liquid itself so that little or no light scattering occurs thereby making the liquid dispersion transparent. It is also preferable that the refractive index matched nanoparticles have a density of at least 2.0 g/cc thereby allowing the density of the liquid dispersion to be rapidly adjusted by making small additions of the refractive index matched nanoparticles. Table 5 describes a list of materials with high densities and a range of refractive indices suitable for use as refractive index matched nanoparticles. The materials listed in Table 5 are representative. As such, it should be understood that other materials can be used.

TABLE 5

| Material | Refractive Index | Density g/cc |
|---|---|---|
| Fused silica | 1.458 | 2.2 |
| SiO2 | 1.548 | 2.18 |
| CaCO3 | 1.572 | 2.71 |
| GeO2 | 1.605 | 4.25 |
| CeF3 | 1.63 | 6.2 |
| MgO | 1.736 | 3.55 |
| Al2O3 | 1.77 | 3.9 |
| Y2O3 | 1.79 | 5 |
| ZnO | 2.008 | 5.6 |
| ZrO2 | 2.215 | 5.7 |
| TiO2 | 2.763 | 4 |

In yet another approach disclosed by the present invention, nanoparticles with particle sizes less than 40 nanometers can be added to at least one of the liquids used in the lens to adjust the density or refractive index of the resulting transparent liquid dispersion. In this approach, it is the size of the nanoparticles that reduces or even eliminates light scattering (as compared to the use of refractive index matched nanoparticles in the approach described above). WO 97/10527, for example, discloses the use of nanoparticles less than 40 nanometers in size to increase the refractive index of plastics for opthalmics while avoiding light scattering and retaining transparency. In an electrically controllable liquid lens or lenses made in accordance with the present invention, nanoparticles having a particle size of less than 40 nanometers can be added to one of the liquids used in the lens, for example, a low viscosity liquid, to create a liquid dispersion with an adjusted density and/or refractive index as compared to the density and/or refractive index of the liquid itself. The density and/or refractive index of the liquid dispersion can be adjusted in order to produce matched densities between the liquid dispersion and the other liquid used in the electrically controllable liquid lens and/or the desired difference in refractive indices. The size of the nanoparticles also helps to make a stable liquid dispersion in which few or no nanoparticles settle out of the dispersion.

In this approach, material selection depends on the liquid used in the lens. For example, the materials listed in Table 5 having a density higher than that of the liquid used in the lens and a refractive index that approximates the refractive index of the liquid used in the lens have been found to work well when adjusting the density of the liquid dispersion. Conversely, the materials listed in Table 5 having refractive indices higher than that of the liquid used in the lens and a density that approximates the density of the liquid used in the lens have been found to work well for adjusting the refractive index of the liquid dispersion. Lastly, materials having densities higher than the liquid and refractive indices higher than the liquid can be used to adjust both the density and refractive index simultaneously.

Table 6 describes two examples of adjustments in density made by the addition of nanoparticles to liquids. In the first example, silica nanoparticles, commercially available from Nissan Chemical America Corporation, Houston, Tex., were added to water to increase the density of the resulting dispersion from 1.0 g/cc to 1.102 g/cc. In this example, the particle size of the silica nanoparticles was 10 nanometers. The refractive index of the silica is 1.548, as shown in Table 5, as compared to the refractive index of water, 1.33, as shown in Table 6. The resulting dispersion was stable and transparent with a substantially increased density and a modestly increased refractive index, as shown in Table 6.

In the second example, silica nanoparticles, commercially available from Nissan Chemical America Corporation, Houston, Tex., were added to ethylene glycol to increase the density of the resulting dispersion from 1.096 g/cc to 1.225 g/cc. The particle size of the silica nanoparticles was 10 nanometers. In this example, the refractive index of the ethylene glycol is 1.4326, as shown in Table 6, which, when compared to water, is closer to that of the silica, 1.548, as shown in Table 5. The resulting dispersion was stable and transparent with a substantially increased density. However, in this example, the refractive index was virtually unchanged, as shown in Table 6.

TABLE 6

| Substance | Density (g/cc) | Index of Refraction ($\lambda = 587$ nm) |
|---|---|---|
| 15% Snowtex SiO2 in H2O | 1.102 | 1.3444 |
| Water | 1 | 1.33 |
| SiO2 in EG E9-ST | 1.225 | 1.4338 |
| Ethylene Glycol | 1.096 | 1.4326 |

The following describes one way of selecting and adjusting the liquids used in an electrically controllable liquid lens made in accordance with the present invention. First, a high refractive index insulating liquid is selected, for example, one of those listed in Table 3, based on the refractive index desired for the liquid lens. Second, a conductive liquid, for example, water, is selected as the other liquid. Third, a salt, for example, one of those listed in Table 4, is added to the conductive liquid to increase the conductivity as desired, and/or decrease the freezing point as desired, and/or increase the density to produce a conductive liquid solution with a density that is closer to that of the high refractive index insulating liquid.

At this point, either of the approaches described above can be used to adjust the density and refractive index of the liquids used in the lens. Using the first approach, high density nanoparticles, for example, one of those listed in Table 5, preferably having a particle size less than 100 nanometers and a refractive index that matches the refractive index of the liquid that nanoparticles are to be added to, are added to either the high refractive index insulating liquid or the conductive liquid solution thereby forming a liquid dispersion having a density that matches that of the other liquid in the electrically controllable liquid.

Using the second approach, nanoparticles, for example, one of those listed in Table 5, having a particle size less than 40 nanometers are added to either the high refractive index insulating liquid or the conductive liquid solution to form a liquid dispersion having a density that matches that of the other liquid. Alternately, nanoparticles, for example, one of those listed in Table 5, having a particle size less than 40 nanometers are added to either the high refractive index insulating liquid or the conductive liquid solution to form a liquid dispersion to adjust the refractive index of the liquid dispersion to produce the desired difference in refractive indices between the liquid dispersion and the other liquid used in the lens.

While the variable power lens element described above have been done so using liquids to create the variable boundary surface, it is contemplated that other types of materials or fluids can be used in the variable power lens element provided these materials or fluids are capable of creating the variable boundary surface, for example, surface R3.

The variable focal length lens system described above is suitable for use in any application where a conventional zoom lens finds application. These applications include, for example, film cameras, digital cameras, video cameras, etc., as well as applications that incorporate these cameras (for example, cell phone cameras, cameras associated with personal computers, etc.). For example, typical design requirements for a digital camera zoom lens include a lens diameter of 3-20 mm and a zoom speed of response of 0.1-2 sec. The variable focal length lens system described above is capable of performing within these design requirements.

In either example embodiment, variable surface R3 can be used to enable rapid close focus for objects not at infinity. This is accomplished by making a small change to the radius of curvature of variable surface R3. During zooming, the image can be caused to move off of the image plane. Making the small radius of curvature change, either during zooming or after zooming, moves the image back onto the image plane while maintaining the overall focal length of the lens system within acceptable tolerances. The small change is less than the change made to the radius of curvature of variable surface R3 during zooming. The lens group G1 remains stationary along the optical axis during this process.

The invention has been described in detail with particular reference to certain preferred embodiments thereof, but it will be understood that variations and modifications can be effected within the scope of the invention.

The invention claimed is:

1. A multiple group variable focal length lens comprising: a lens group located in a fixed position along an optical axis, the lens group including an electrically controllable liquid lens having a variable power lens element, the variable power lens element including a surface having a variable radius of curvature created by two liquids having distinct indices of refraction, wherein one of the liquids has an index of refraction greater than 1.60.

2. A liquid lens comprising:
a first surface;
and second surface; and
a first liquid and a second liquid located between the first surface and the second surface such that an interface between the first liquid and the second liquid forms a surface having a variable radius of curvature, wherein at least one of the first liquid and the second liquid includes nanoscale particles.

3. The liquid lens according to claim 2, wherein the nanoscale particles have a density higher than that of the liquid containing the nanoscale particles.

4. The liquid lens according to claim 2, wherein the nanoscale particles have a refractive index higher than that of the liquid containing the nanoscale particles.

5. The liquid lens according to claim 2, wherein at least one of the first liquid and the second liquid includes mixed salts.

6. The liquid lens according to claim 5, wherein the mixed salts have a density higher than that of the liquid containing the mixed salts.

7. The liquid lens according to claim 5, wherein the mixed salts have a refractive index higher than that of the liquid containing the mixed salts.

8. The liquid lens according to claim 2, wherein at least one of the first surface and the second surface has optical power.

9. The liquid lens according to claim 8, wherein the optical power is spherical.

10. The liquid lens according to claim 8, wherein the optical power is aspherical.

11. A multiple group variable focal length lens comprising:
a first lens group including a variable power lens element, the first lens group being positioned in a stationary manner along an optical axis; and
a second lens group moveably positioned along the optical axis, wherein the variable power optical element comprises an electrically controllable liquid lens including a surface having a variable radius of curvature created by two liquids having distinct indices of refraction, one liquid having an index of refraction of X and the other liquid having an index of refraction of 0.85X to 0.95X.

12. The lens according to claim 11, wherein one of the liquids has an index of refraction greater than 1.60.

13. A multiple group variable focal length lens comprising:
a first lens group including a variable power lens element, the first lens group being positioned in a stationary manner along an optical axis, the first group having optical power; the variable power lens element comprising a liquid crystal lens, the liquid crystal lens including a liquid crystal material; and
a second lens group moveably positioned along the optical axis, the second lens group having optical power, wherein an absolute value of the optical power of the first lens group is less than an absolute value of the optical power of the second lens group.

14. The lens according to claim 13, wherein the variable power lens element comprises a surface having a variable radius of curvature positioned between two additional surfaces.

15. The lens according to claim 14, wherein at least one of the two additional surfaces of the variable power lens element has optical power.

16. The lens according to claim 15, wherein the optical power is spherical.

17. The lens according to claim 15, wherein the optical power is aspherical.

18. The lens according to claim 13, wherein the first lens group comprises at least one additional optical element.

19. The lens according to claim 18, wherein the at least one additional optical element is located on an object side of the variable power lens element.

20. The lens according to claim 18, wherein the at least one additional optical element is located on an image side of the variable power lens element.

21. The lens according to claim 13, wherein the first lens group and the second lens group are positioned in order from an object side of the optical axis.

22. The lens according to claim 13, further comprising at least one additional lens group.

23. The lens according to claim 22, wherein the at least one additional lens group is a moving lens group.

24. A multiple group variable focal length lens comprising:
a first lens group including a variable power lens element, the first lens group being positioned in a stationary manner along an optical axis; and
a second lens group moveably positioned along the optical axis, wherein the variable power optical element comprises an electrically controllable liquid lens including a surface having a variable radius of curvature, the surface having the variable radius of curvature being created by two liquids having distinct indices of refraction with one of the liquids having an index of refraction greater than 1.60.

25. The lens according to claim 24, wherein one liquid has an index of refraction X and the other liquid has an index of refraction of approximately 0.90X.

26. A multiple group variable focal length lens comprising:
a first lens group including a variable power lens element, the first lens group being positioned in a stationary manner along an optical axis, the first group having optial power, the variable power lens element comprising an electrically controllable liquid lens, the electrically controllable liquid lens including two liquids, each liquid having a distinct refractive index when compared to each other; and
a second lens group moveably positioned along the optical axis, the second lens group having optical power, wherein an absolute value of the optical power of the first lens group is less than an absolute value of the optical power of the second lens group.

27. The lens according to claim 26, the electrically controllable liquid lens including a surface having a variable radius of curvature, wherein the surface having the variable radius of curvature is created by the two liquids having the distinct indices of refraction.

28. The lens according to claim 27, wherein one of the liquids has an index of refraction greater than 1.60.

29. The lens according to claim 27, wherein one liquid has an index of refraction of X and the other liquid has an index of refraction of 0.85X to 0.95X.

30. The lens according to claim 27, wherein one liquid has an index of refraction X and the other liquid has an index of refraction of approximately 0.90X.

* * * * *